US012179502B2

(12) United States Patent
Sugai et al.

(10) Patent No.: US 12,179,502 B2
(45) Date of Patent: Dec. 31, 2024

(54) THREE-DIMENSIONAL PRINTING DEVICE

(71) Applicant: SEIKO EPSON CORPORATION, Tokyo (JP)

(72) Inventors: Keigo Sugai, Chino (JP); Masaru Kumagai, Shiojiri (JP)

(73) Assignee: SEIKO EPSON CORPORATION (JP)

(*) Notice: Subject to any disclaimer, the term of this patent is extended or adjusted under 35 U.S.C. 154(b) by 273 days.

(21) Appl. No.: 17/949,330

(22) Filed: Sep. 21, 2022

(65) Prior Publication Data

US 2023/0088150 A1 Mar. 23, 2023

(30) Foreign Application Priority Data

Sep. 22, 2021 (JP) ................................ 2021-154370

(51) Int. Cl.

| | |
|---|---|
| ***B41J 3/407*** | (2006.01) |
| ***B41J 2/045*** | (2006.01) |
| ***B41J 2/21*** | (2006.01) |
| ***B41J 25/308*** | (2006.01) |

(52) U.S. Cl.

CPC ......... *B41J 3/4073* (2013.01); *B41J 2/04573* (2013.01); *B41J 25/3086* (2013.01); *B41J 2/2132* (2013.01)

(58) Field of Classification Search

CPC ... B41J 3/4073; B41J 2/04573; B41J 25/3086

See application file for complete search history.

(56) References Cited

U.S. PATENT DOCUMENTS

2001/0017085 A1 8/2001 Kubo et al.

FOREIGN PATENT DOCUMENTS

| | | | | |
|---|---|---|---|---|
| JP | 09193368 A | * | 7/1997 | ............ B41J 3/4073 |
| JP | 2001-239652 A | | 9/2001 | |
| JP | 2008-246855 A | | 10/2008 | |

* cited by examiner

*Primary Examiner* — Julian D Huffman

(74) *Attorney, Agent, or Firm* — Harness, Dickey & Pierce, P.L.C.

(57) ABSTRACT

A three-dimensional printing device includes a first head having a first nozzle array that ejects liquid, a second head having a second nozzle array that ejects liquid, and a moving mechanism having a linear motion mechanism that changes relative positions of the heads with respect to a three-dimensional workpiece. The first region of the workpiece is more inclined with respect to the first axis than the second region of the workpiece. A time period when the first nozzle array faces the first region and the second nozzle array faces the second region is a first time period. In the first time period, the first nozzle array ejects the liquid onto the first region in a first ejection cycle. In the first time period, the second nozzle array ejects the liquid onto the second region in a second ejection cycle. The first ejection cycle is shorter than the second ejection cycle.

13 Claims, 11 Drawing Sheets

FIG. 9

Db

| NUMBER OF PULSES | EJECTION CYCLE | |
|---|---|---|
| | HEAD 310_1 | HEAD 310_4 |
| 0≦CNT<Pa | TuA | TuB |
| Pa≦CNT | TuB | TuB |

FIG. 10

Dc

| NUMBER OF PULSES | MOVEMENT AMOUNT | |
|---|---|---|
| | NOZZLE SURFACE FD_1 | NOZZLE SURFACE FD_4 |
| 0≦CNT<Pa | mz1 | 0 |
| Pa≦CNT | 0 | 0 |

THREE-DIMENSIONAL PRINTING DEVICE

The present application is based on, and claims priority from JP Application Serial Number 2021-154370, filed Sep. 22, 2021, the disclosure of which is hereby incorporated by reference herein in its entirety.

BACKGROUND

1. Technical Field

The present disclosure relates to a three-dimensional printing device.

2. Related Art

A three-dimensional printing device that performs printing on a surface of a three-dimensional workpiece by an ink jet method is known. For example, JP-A-2008-246855 discloses a three-dimensional printing device having a head that ejects ink as an example of liquid onto a surface of a workpiece having a curved surface.

However, the existing technique has a problem that, when the workpiece has two regions inclined at different angles, resolutions in the two regions are different from each other and the quality of an image formed on the surface of the workpiece decreases.

SUMMARY

To solve the above-described problem, according to an aspect of the present disclosure, a three-dimensional printing device includes a first head having a first nozzle array that ejects liquid, a second head having a second nozzle array that ejects liquid, and a moving mechanism having a linear motion mechanism that changes relative positions of the first head and the second head with respect to a three-dimensional workpiece along a first axis. When the workpiece includes a first region and a second region adjacent to the first region, the first region is more inclined with respect to the first axis than the second region as viewed along a second axis intersecting the first axis, and a time period when the first nozzle array faces the first region and the second nozzle array faces the second region during execution of movement by the linear motion mechanism is a first time period, the first nozzle array ejects the liquid onto the first region in a first ejection cycle in the first time period, and the second nozzle array ejects the liquid onto the second region in a second ejection cycle in the first time period. The first ejection cycle is shorter than the second ejection cycle.

According to another aspect of the present disclosure, a three-dimensional printing device includes a first head having a first nozzle surface in which a first nozzle array that ejects liquid is provided, a second head having a second nozzle surface in which a second nozzle array that ejects liquid is provided, and a moving mechanism having a linear motion mechanism that changes relative positions of the first head and the second head with respect to a three-dimensional workpiece along a first axis. The moving mechanism includes a first elevating mechanism that is moved by the linear motion mechanism to move the first nozzle surface along a third axis intersecting the first axis, and a second elevating mechanism that is moved by the linear motion mechanism to move the second nozzle surface along the third axis. When a predetermined time period during execution of movement by the linear motion mechanism is a first time period, a cycle in which the first nozzle array ejects the liquid is a first ejection cycle in the first time period, and a cycle in which the second nozzle array ejects the liquid is a second ejection cycle in the first time period, an amount of movement of the first nozzle surface along the third axis in the first time period is larger than an amount of movement of the second nozzle surface along the third axis in the first time period. The first ejection cycle is shorter than the second ejection cycle.

BRIEF DESCRIPTION OF THE DRAWINGS

FIG. 9 is a diagram illustrating an example of details of first correspondence information.

FIG. 10 is a diagram illustrating an example of details of second correspondence information.

DESCRIPTION OF EXEMPLARY EMBODIMENTS

Figure 1:
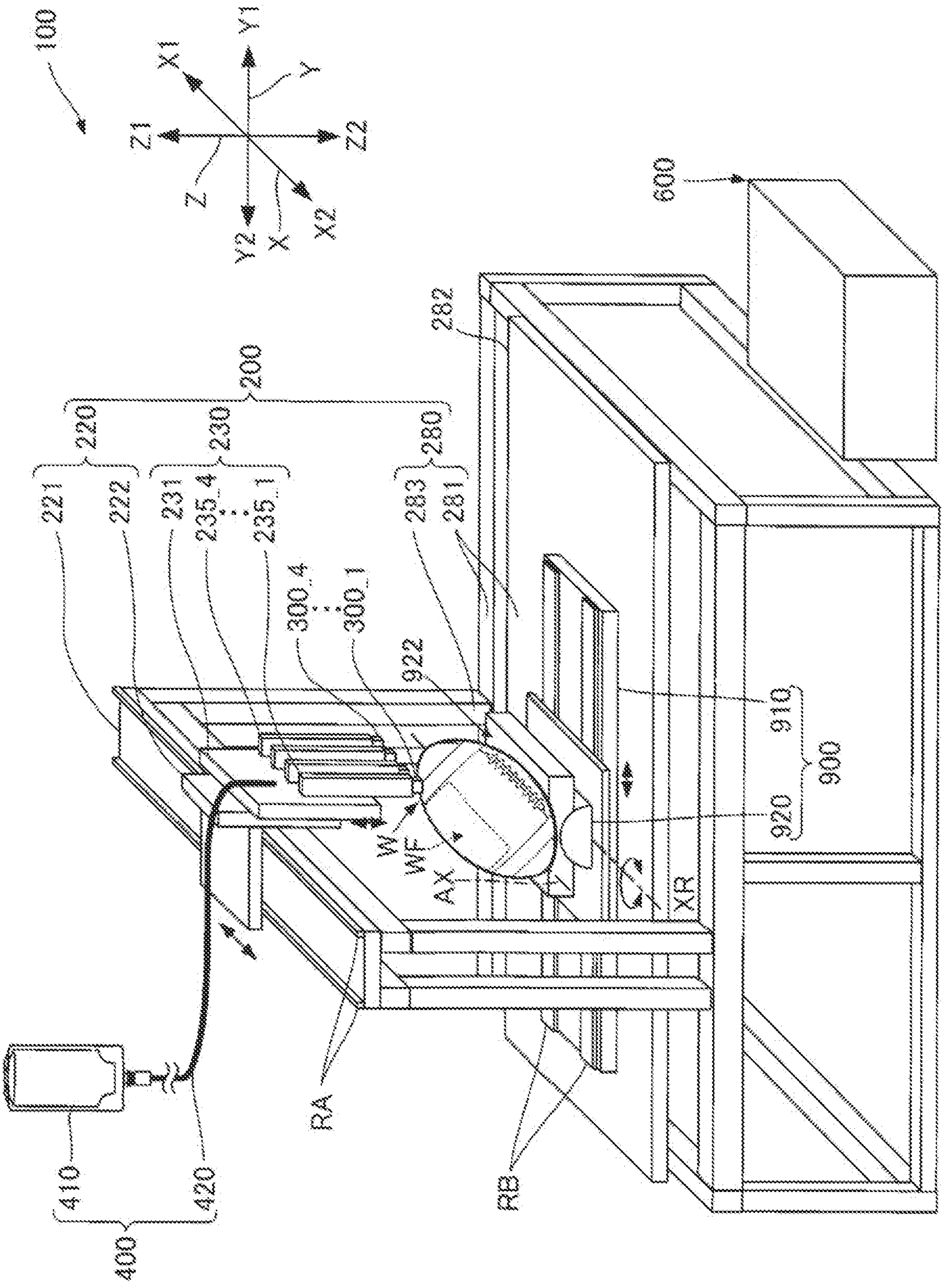
FIG. 1 is a perspective view schematically illustrating a three-dimensional printing device according to a first embodiment.

Hereinafter, embodiments of the present disclosure are described with reference to the drawings. However, in the drawings, dimensions and scale of each part are appropriately different from the actual dimensions and scale. In addition, since the embodiments described below are specific preferred examples of the present disclosure, various limitations that are technically preferable are given. However, the scope of the present disclosure is not limited to these embodiments unless it is stated in the following description that the present disclosure is particularly limited.

The following description will be given using X, Y, and Z axes intersecting each other as appropriate. In addition, one direction extending along the X axis is referred to as an X1 direction, while the other direction extending along the X axis and opposite to the X1 direction is referred to as an X2 direction. Similarly, directions extending along the Y axis and opposite to each other are referred to as a Y1 direction and a Y2 direction. In addition, directions extending along the Z axis and opposite to each other are referred to as a Z1 direction and a Z2 direction.

The X axis, the Y axis, and the Z axis are coordinate axes in a base coordinate system set in a space in which a workpiece table 281 is installed. The space is described later.

Typically, the Z axis is a vertical axis and the Z2 direction is a downward direction in the vertical direction. The Z axis may not be the vertical axis. In addition, the X axis, the Y axis, and the Z axis are typically orthogonal to each other but are not limited thereto. The X axis, the Y axis, and the Z axis may not be orthogonal to each other. For example, the X axis, the Y axis, and the Z axis may intersect each other at an angle in a range of 80 degrees or greater and 100 degrees or less.

1. First Embodiment

1-1. Overview of Three-Dimensional Printing Device

FIG. 1 is a perspective view schematically illustrating a three-dimensional printing device 100 according to a first embodiment. The three-dimensional printing device 100 performs printing on a surface of a three-dimensional workpiece W by an ink jet method.

The workpiece W is a print medium and has a surface WF to be printed. In an example illustrated in FIG. 1, the workpiece W is a rugby ball that forms a long spherical shape around its long axis AX, and the surface WF is a curved surface with non-constant curvature. In the present embodiment, the workpiece W is placed such that the long axis AX is parallel to the X axis. The workpiece W is not limited to the rugby ball. For example, the workpiece W is a product of a certain type. Performing printing on the surface WF is one process among a series of processes of manufacturing this product. The shape, size, or the like of the workpiece W is not limited to the example illustrated in FIG. 1. The workpiece W is of any shape, any size, or the like. For example, the surface of the workpiece W may include a surface such as a flat surface, a step surface, or an uneven surface. For example, the surface WF exemplified in FIG. 1 is a curved surface protruding toward the Z1 direction. However, the surface WF may be a curved surface recessed toward the Z2 direction. In addition, the orientation of the workpiece W placed is not limited to the example illustrated in FIG. 1. The workpiece W placed may be oriented in any direction.

In the example illustrated in FIG. 1, the three-dimensional printing device 100 is an ink jet printer that uses an orthogonal robot that moves along two axes orthogonal to each other. Specifically, as illustrated in FIG. 1, the three-dimensional printing device 100 includes a moving mechanism 200, four liquid ejection units 300, a liquid supply unit 400, a controller 600, and a workpiece support mechanism 900. The four liquid ejection units 300 are liquid ejection units 300_1 to 300_4. In the following description, each of the liquid ejection units 300_1 to 300_4 may be referred to as a liquid ejection unit 300. The units of the three-dimensional printing device 100 illustrated in FIG. 1 are briefly sequentially described below.

The moving mechanism 200 changes relative positions of the liquid ejection units 300 with respect to the workpiece W. The moving mechanism 200 includes a linear motion mechanism 220, an elevating mechanism 230, and a support section 280.

Figure 4:
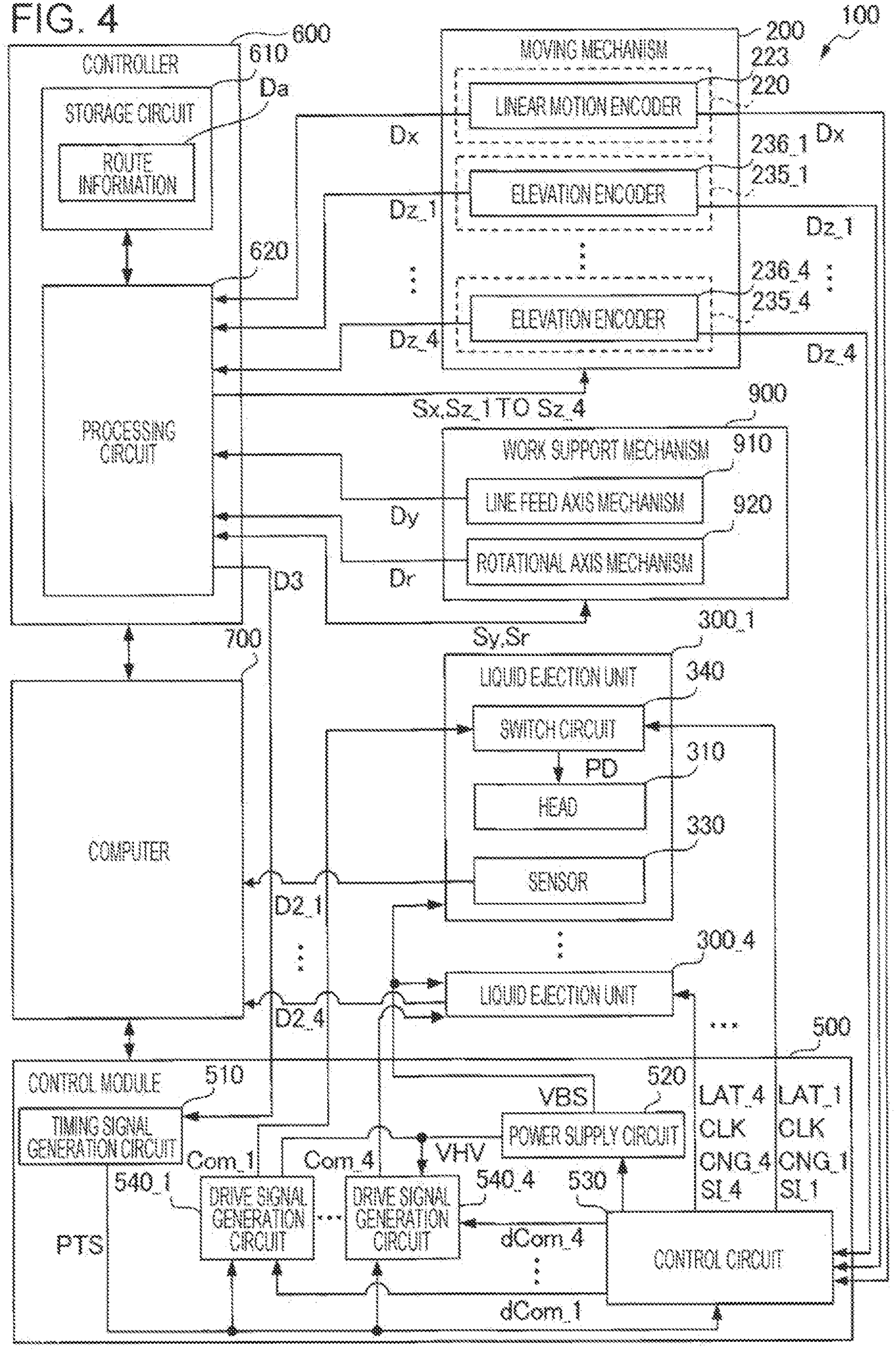
FIG. 4 is a block diagram illustrating an electrical configuration of the three-dimensional printing device according to the first embodiment.

The linear motion mechanism 220 changes relative positions of the four liquid ejection units 300 with respect to the workpiece W along the X axis. Specifically, the linear motion mechanism 220 moves the liquid ejection units 300 along the X axis, thereby changing the relative positions of the four liquid ejection units 300 with respect to the workpiece W along the X axis. The linear motion mechanism 220 includes a rail member 221 and a carriage 222. The rail member 221 is a flat member for the carriage 222 to move along the X axis. Two rails RA extending along the X axis are mounted on a surface of the rail member 221 in the Z1 direction. The carriage 222 is slidably engaged with the rails RA. Although not illustrated in the drawings, a drive mechanism that moves the carriage 222 is included in the linear motion mechanism 220. The drive mechanism includes, for example, a motor that generates drive force for moving the carriage 222, a reducer that reduces the drive force and outputs the reduced drive force, and a linear motion encoder 223 that detects an operational amount for the movement. FIG. 4 illustrates the linear motion encoder 223.

The X axis is an example of a "first axis".

In the present embodiment, the linear motion encoder 223 is a transmissive linear encoder that detects the position of the carriage 222 in the direction along the X axis. The linear motion encoder 223 is constituted by a scale and an optical sensor. The scale is a band-shaped member fixed to the rail member 221 and extending along the X axis. The scale has a light transmissive base member and light shielding patterns arranged at fixed intervals on the base member. The optical sensor irradiates the scale with light, receives light transmitted through the scale, and outputs a signal according to a change in a relative position to the scale. It suffices for the linear motion encoder 223 to be able to detect the position of the carriage 222 in the direction along the X axis. The linear motion encoder 223 may be a reflective linear encoder or a rotary encoder.

The elevating mechanism 230 moves the four liquid ejection units 300 along the Z axis. The elevating mechanism 230 includes a support plate 231 and four individual elevating mechanisms 235. The four individual elevating mechanisms 235 are individual elevating mechanisms 235_1 to 235_4. In the following description, each of the individual elevating mechanisms 235_1 to 235_4 may be referred to as an individual elevating mechanism 235. Elements included in the individual elevating mechanisms 235 may be described below using _k. k represents integers from 1 to 4.

A relationship between the elevating mechanism 230 and each of the liquid ejection units 300 is described with reference to FIG. 2.

Figure 2:
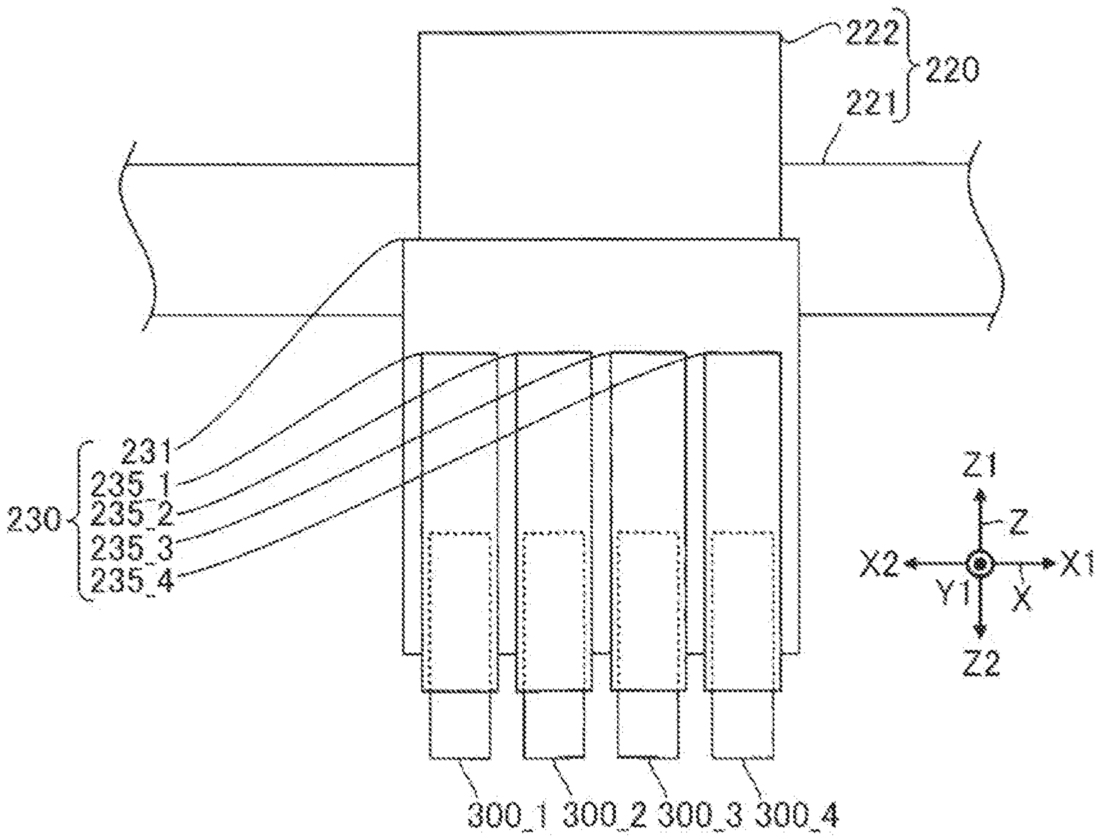
FIG. 2 is a diagram describing a relationship between an elevating mechanism and each of liquid ejection units.

FIG. 2 is a diagram illustrating the relationship between the elevating mechanism 230 and each of the liquid ejection units 300. The diagram illustrated in FIG. 2 is a view of the vicinity of the elevating mechanism 230 from the Y1 direction toward the Y2 direction.

The support plate 231 supports the individual elevating mechanisms 235 and is fixed to the carriage 222. When the carriage 222 moves along the X axis, the support plate 231 attached to the carriage 222 also moves along the X axis. However, the elevating mechanism 230 may have a mechanism that uniformly moves the four liquid ejection units 300 along the Z axis, instead of the support plate 231.

Each of the individual elevating mechanisms 235 moves a respective one of the four liquid ejection units 300 along the Z axis. The individual elevating mechanisms 235 are fixed to the support plate 231. For example, each of the individual elevating mechanisms 235 includes a rail plate having a pair of rails extending along the Z axis, and a support plate that is slidably engaged with the rails of the rail plate. The liquid ejection units 300 as end effectors are attached to the support plates in a state in which the liquid ejection units 300 are fixed to the support plates via screws or the like. Although not illustrated in the drawings, each of the individual elevating mechanisms 235 has a drive mechanism that moves the corresponding liquid ejection unit 300 along the Z axis. Each of the drive mechanisms includes, for example, a motor that generates drive force for moving the liquid ejection unit 300, a reducer that reduces the drive force and outputs the reduced drive force, and an elevation encoder 236 that detects an operational amount for the movement. FIG. 4 illustrates the elevation encoders 236.

The Z axis is an example of a "third axis".

In the present embodiment, the elevation encoders 236 are transmissive linear encoders that detect the positions of the liquid ejection units 300 in the direction along the Z axis, and a basic configuration of each of the elevation encoders 236 is the same as or similar to that of the linear motion encoder 223. The elevation encoders 236 may be reflective linear encoders or rotary encoders.

Specifically, the liquid ejection units 300_*k* are attached to the individual elevating mechanisms 235_*k*. In this case, k represents the integers from 1 to 4. The individual elevating mechanisms 235_1 to 235_4 are arranged from the X2 direction in the order of the individual elevating mechanisms 235_1, 235_2, 235_3, and 235_4.

One of any two of the four individual elevating mechanisms 235_1 to 235_4 that is located in the X2 direction is an example of a "first elevating mechanism", and the elevation encoder 236 of the one individual elevating mechanism 235 is an example of a "first elevation encoder". In addition, the other of the two of the four individual elevating mechanisms 235_1 to 235_4 that is located in the X1 direction is an example of a "second elevating mechanism", and the elevation encoder 236 of the other individual elevating mechanism 235 is an example of a "second elevation encoder".

The liquid ejection units 300 eject ink toward the workpiece W. The ink is an example of liquid. The ink is not particularly limited. Examples of the ink are water-based ink in which a color material such as dye or pigment is dissolved in a water-based solvent, curable ink containing curable resin such as ultraviolet curable resin, and solvent-based ink in which a color material such as dye or pigment is dissolved in an organic solvent. The ink is not limited to a solution and may be ink in which a color material or the like is dispersed as a dispersoid in a dispersion medium. In addition, the ink is not limited to ink containing a color material and may be ink containing, as a dispersoid, a conductive particle such as a metal particle for forming a wiring or the like. When the curable ink is used, each of the liquid ejection units 300 includes an emitting unit that emits energy to cure the ink.

The present embodiment describes a case where the three-dimensional printing device 100 uses four types of ink, ink containing a cyan color material, ink containing a magenta color material, ink containing a yellow color material, and ink containing a black color material. In the present embodiment, since the four types of ink are used, the three-dimensional printing device 100 includes the four liquid ejection units 300. However, the number of liquid ejection units 300 included in the three-dimensional printing device 100 is not limited to four and may be one or may be two or more. In addition, the number of types of ink is not limited to four. The three-dimensional printing device 100 may use one type of ink or a plurality of types of ink. For example, the three-dimensional printing device 100 may include six liquid ejection units 300, and each of the six liquid ejection units 300 may supply a respective one of six types of ink that are the four types of ink described above, ink containing a white color material, and clear ink. Each of the liquid ejection units 300 is described in detail below with reference to FIG. 3.

Figure 3:
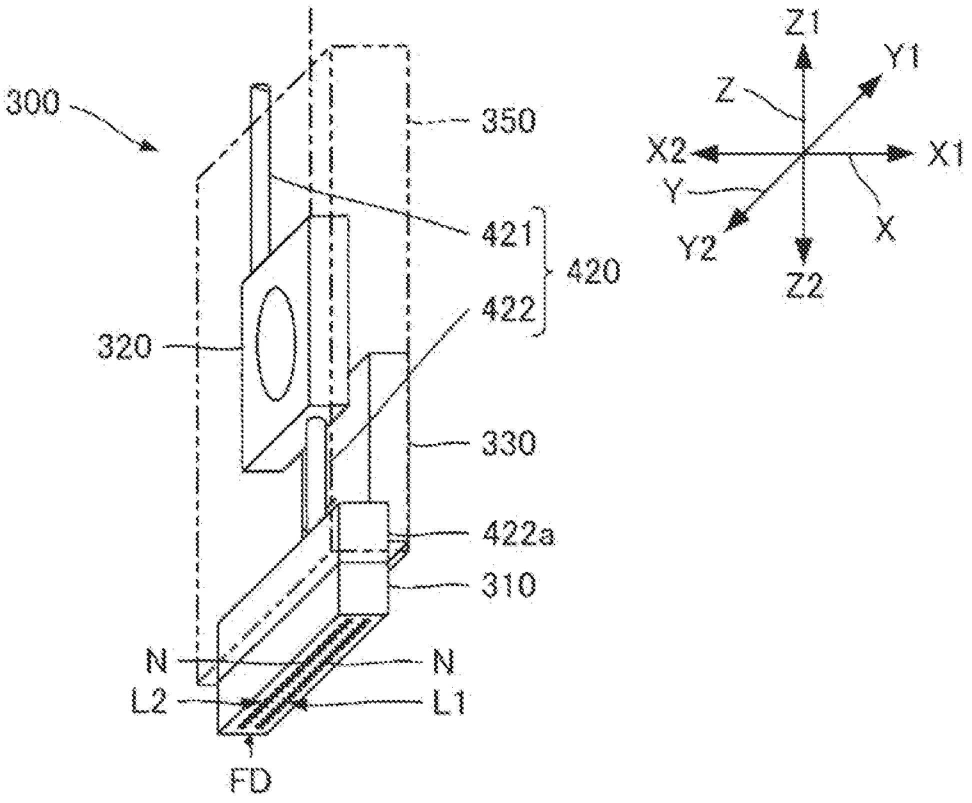
FIG. 3 is a perspective view illustrating a schematic configuration of the liquid ejection unit.

FIG. 3 is a perspective view illustrating a schematic configuration of the liquid ejection unit 300. The liquid ejection unit 300 includes a head 310, a pressure control valve 320, and a sensor 330. The head 310, the pressure control valve 320, and the sensor 330 are supported by a support body 350 indicated by a dashed-and-double-dotted line in FIG. 3.

The head 310 includes a plurality of piezoelectric elements not illustrated in the drawings, a plurality of cavities not illustrated in the drawings, and a plurality of nozzles N. The cavities store the ink. Each of the nozzles N is provided for a respective one of the cavities and communicate with the cavity. Each of the piezoelectric elements is provided for a respective one of the cavities and change pressure applied to the ink in the cavity to eject the ink from the nozzle N corresponding to the cavity. Instead of the piezoelectric elements, a heater that heats the ink in the cavities may be used as a drive element that eject the ink from the nozzles N. The head 310 ejects the ink from the nozzles N toward the Z2 direction under an ideal condition. That is, the Z2 direction is a direction toward which the ink is ejected.

The head 310 has a nozzle surface FD in which the plurality of nozzles N are provided. In the example illustrated in FIG. 3, the normal direction of the nozzle surface FD is the Z1 direction, and the nozzles N are classified into a first nozzle array L1 and a second nozzle array L2 that are spaced apart in the direction along the X axis. Each of the first nozzle array L1 and the second nozzle array L2 is a set of a plurality of nozzles N linearly arrayed in the direction along the Y axis. Elements relating to the nozzles N of the first nozzle array L1 of the head 310 and elements relating to the nozzles N of the second nozzle array L2 of the head 310 are substantially symmetrical to each other with respect to the direction along the X axis. In the following description, each of the first nozzle array L1 and the second nozzle array L2 may be referred to as a nozzle array L.

The head 310 included in the liquid ejection unit 300 that is among the liquid ejection units 300_1 to 300_4 and attached to the individual elevating mechanism 235 corresponding to the "first elevating mechanism" is an example of a "first head", the nozzle surface FD of this head 310 is an example of a "first nozzle surface", and the first nozzle array L1 and the second nozzle array L2 provided in this nozzle surface FD are an example of a "first nozzle array". In addition, the head 310 included in the liquid ejection unit 300 attached to the individual elevating mechanism 235 corresponding to the "second elevating mechanism" is an example of a "second head", the nozzle surface FD of this head 310 is an example of a "second nozzle surface", and the first nozzle array L1 and the second nozzle array L2 provided in this nozzle surface FD are an example of a "second nozzle array".

However, the positions of the nozzles N of the first nozzle array L1 in the direction along the Y axis may match or be different from the positions of the nozzles N of the second nozzle array L2 in the direction along the Y axis. In addition, the elements relating to the nozzles N of one of the first nozzle array L1 and the second nozzle array L2 may be omitted. A configuration in which the positions of the nozzles N of the first nozzle array L1 in the direction along the Y axis match the positions of the nozzles N of the second nozzle array L2 in the direction along the Y axis is exemplified below.

The pressure control valve 320 is a valve mechanism that is opened and closed according to pressure applied to the ink within the head 310. The pressure applied to the ink within the head 310 is maintained at a negative level in a predetermined range. Therefore, a meniscus of the ink formed in the nozzles N of the head 310 is stabilized.

The sensor 330 detects a relative positional relationship of the head 310 with respect to the workpiece W in the Z axis direction. Specifically, the sensor 330 is a distance sensor that is an optical displacement meter or the like and measures a distance from a reference surface whose relative position to the workpiece W is fixed. The reference surface is not illustrated in the drawings.

The support body 350 is made of, for example, a metal material or the like and is a substantially rigid body. In FIG. 3, the support body 350 forms a flat box. However, the shape of the support body 350 is not particularly limited and may be any shape. The support body 350 is attached to the individual elevating mechanism 235 in the Z2 direction.

In the example illustrated in FIG. 3, the pressure control valve 320 is located in the Z1 direction with respect to the head 310. The sensor 330 is located in the X1 direction with respect to the head 310.

When the ink ejected by the head 310 is curable ink containing curable resin such as ultraviolet curable resin, an energy emitting unit that is an ultraviolet light source or the like and cures the ink may be provided in addition to the liquid ejection unit 300. In this case, it is preferable that the energy emitting unit be mounted on the carriage 222 in a similar manner to the liquid ejection unit 300, moved in the X axis direction, and moved by an individual elevating mechanism in the Z direction in a similar manner to the liquid ejection unit 300. In order to cure the ink landed on the workpiece W, the individual elevating mechanism that moves the energy emitting unit in the Z direction is located in the opposite direction to a direction toward which the head 310 is moved by the linear motion mechanism 220 with respect to the individual elevating mechanism 235 during a printing operation. Although described later, in the present embodiment, the head 310 is moved from the X2 direction toward the X1 direction during the printing operation and thus the individual elevating mechanism that moves the energy emitting unit in the Z direction is located in the X2 direction with respect to the individual elevating mechanism 235.

The individual elevating mechanism that moves the energy emitting unit in the Z direction is an example of a "third elevating mechanism".

The description returns to FIG. 1. The liquid supply unit 400 is a mechanism that supplies the ink to the heads 310. The liquid supply unit 400 includes a liquid reservoir 410 and a supply flow path 420.

The liquid reservoir 410 is a container that stores the ink. The liquid reservoir 410 is, for example, a bag-shaped ink pack formed of a flexible film.

The supply flow path 420 is a flow path through which the ink is supplied from the liquid reservoir 410 to the heads 310. The pressure control valves 320 are provided in the middle of the supply flow path 420. Therefore, even when a positional relationship between the heads 310 and the liquid reservoir 410 changes due to the operation of the moving mechanism 200, it is possible to reduce a variation in the pressure applied to the ink within the heads 310.

Furthermore, the supply flow path 420 is sectioned into an upstream flow path 421 and a downstream flow path 422 by the pressure control valves 320, as illustrated in FIG. 3. That is, the supply flow path 420 includes the upstream flow path 421 through which the liquid reservoir 410 communicates with the pressure control valves 320, and the downstream flow path 422 through which the pressure control valves 320 communicate with the heads 310. In the example illustrated in FIG. 3, a part of the downstream flow path 422 of the supply flow path 420 is constituted by a flow path member **422*a*. The flow path member 422*a* includes a flow path that distributes the ink from the pressure control valves 320 to a plurality of portions of the heads 310**.

A part of the supply flow path 420 may be made of an inflexible material. In addition, a part of the supply flow path 420 may include a distribution flow path that distributes the ink to the plurality of portions. A part of the supply flow path 420 may be integrated with the heads 310 or the pressure control valves 320.

The controller 600 is a robot controller that controls driving of the moving mechanism 200 and driving of the workpiece support mechanism 900. Although not illustrated in FIG. 1, the controller 600 is electrically coupled to a control module that controls ejection operations of the liquid ejection units 300. A computer is communicably connected to the controller 600 and the control module. The control module corresponds to a control module 500 illustrated in FIG. 4 and described later. The computer corresponds to a computer 700 illustrated in FIG. 4 and described later.

The workpiece support mechanism 900 supports the workpiece W and changes one or both of the position of the workpiece W and the orientation of the workpiece W. The workpiece support mechanism 900 includes a line feed axis mechanism 910 and a rotational axis mechanism 920. The line feed axis mechanism 910 includes a flat member that moves the workpiece W along the Y axis. Two rails RB extending along the Y axis are provided on a surface of the flat member in the Z1 direction.

The rotational axis mechanism 920 can rotate around its rotational axis XR extending along the X axis. The rotational axis mechanism 920 includes a placement surface 922. The workpiece W is placed on the placement surface 922. When the rotational axis mechanism 920 rotates, the orientation of the placement surface 922 changes. When the orientation of the placement surface 922 changes, the orientation of the workpiece W placed on the placement surface 922 changes.

The Y axis is an example of a "second axis".

1-2. Electrical Configuration of Three-Dimensional Printing Device 100

FIG. 4 is a block diagram illustrating an electrical configuration of the three-dimensional printing device 100 according to the first embodiment. FIG. 4 illustrates electrical constituent components among constituent components of the three-dimensional printing device 100. FIG. 4 illustrates the linear motion encoder 223 and the elevation encoders 236_1 to 236_4.

As illustrated in FIG. 4, the three-dimensional printing device 100 includes the control module 500 and the computer 700 in addition to the moving mechanism 200, the liquid ejection units 300, the controller 600, and the workpiece support mechanism 900, which are described above. It can be said that the controller 600, the control module 500, and the computer 700 are controllers that control the liquid ejection units 300, the moving mechanism 200, and the workpiece support mechanism 900. Before a detailed description of the controller 600, the control module 500 and the computer 700 are sequentially described below.

Electrical constituent components described below may be divided as appropriate. One or more of the electrical constituent components may be included in another one or more of the electrical constituent components or may be integrated with another one or more of the electrical constituent components.

The controller 600 includes a function of controlling the driving of the moving mechanism 200, a function of controlling the driving of the workpiece support mechanism 900, and a function of generating a signal D3 to synchronize an operation of ejecting the ink by the liquid ejection units 300 with the operation of the moving mechanism 200. The controller 600 includes a storage circuit 610 and a processing circuit 620.

The storage circuit 610 stores various programs to be executed by the processing circuit 620 and various types of data to be processed by the processing circuit 620.

In the storage circuit 610, route information Da is stored. The route information Da is information indicating a movement route along which the heads 310 need to move. The route information Da is, for example, represented using coordinate values in the base coordinate system. The route information Da is determined based on workpiece information indicating the position of the workpiece W and the shape of the workpiece W. The workpiece information is obtained by associating information such as computer-aided design (CAD) data indicating the three-dimensional shape of the workpiece W with the above-described base coordinate system. The route information Da is input to the storage circuit 610 from the computer 700.

The processing circuit 620 controls, based on the route information Da, operations of the linear motion mechanism 220, the elevating mechanism 230, the line feed axis mechanism 910, and the rotational axis mechanism 920 and generates the signal D3. Specifically, the processing circuit 620 performs calculation to convert the route information Da into operational amounts such as the positions and speeds of the linear motion mechanism 220 and the elevating mechanism 230, and performs calculation to convert the route information Da into operational amounts such as the positions and speeds of the line feed axis mechanism 910 and the rotational axis mechanism 920. Then, the processing circuit 620 outputs control signals Sx and Sz_1 to Sz_4 based on an output signal Dx from the linear motion encoder 223 and output signals Dz_1 to Dz_4 from the elevation encoders 236_1 to 236_4 so that operation amounts of the linear motion mechanism 220 and the elevating mechanism 230 are the results of the above-described calculation. The control signal Sx controls driving of a motor included in the linear motion mechanism 220. The control signals Sz_k control driving of motors included in the individual elevating mechanisms 235_*k*. In this case, k represents the integers from 1 to 4. Each of the output signals Dz_1 to Dz_4 may be hereinafter referred to as an output signal Dz. The output signal Dx and the output signals Dz are pulse signals.

Similarly, the processing circuit 620 outputs control signals Sy and Sr based on an output signal Dy output from an encoder included in the line feed axis mechanism 910 and an output signal Dr output from an encoder included in the rotational axis mechanism 920 so that operational amounts of the line feed axis mechanism 910 and the rotational axis mechanism 920 are the results of the above-described calculation. The control signal Sy controls driving of a motor included in the line feed axis mechanism 910. The control signal Sr controls driving of a motor included in the rotational axis mechanism 920.

In addition, the processing circuit 620 generates the signal D3 based on one or more of the output signals Dx, Dz_1 to Dz_4, Dy, and Dr. For example, the processing circuit 620 generates the signal D3 based on one of the output signals Dx, Dz_1 to Dz_4, Dy, and Dr. For example, the processing circuit 620 generates, as the signal D3, a signal that includes a pulse when one of the output signals Dx, Dz_1 to Dz_4, Dy, and Dr becomes a predetermined value.

The control module 500 is a circuit that controls the ejection operations of the heads 310 based on the signal D3 output from the controller 600 and print data Img from the computer 700. The control module 500 includes a timing signal generation circuit 510, a power supply circuit 520, a control circuit 530, and drive signal generation circuits 540_1 to 540_4. Each of the drive signal generation circuits 540_1 to 540_4 may be hereinafter referred to as a drive signal generation circuit 540.

The timing signal generation circuit 510 generates a timing signal PTS based on the signal D3. The timing signal PTS is a pulse signal. The timing signal generation circuit 510 is constituted by, for example, a timer that starts generating the timing signal PTS in response to detecting the signal D3. That is, the signal D3 functions as a trigger signal that defines the timing of starting the ejection of the ink by the liquid ejection units 300.

The power supply circuit 520 receives power supplied from a commercial power supply not illustrated to generate predetermined various potentials. The generated various potentials are supplied to the units of the three-dimensional printing device 100 as appropriate.

The control circuit 530 generates control signals SI_1 to SI_4, waveform specifying signals dCom_1 to dCom_4, latch signals LAT_1 to LAT_4, a clock signal CLK, and change signals CNG_1 to CNG_4 based on the timing signal PTS. The control signals SI_1 to SI_4, the waveform specifying signals dCom_1 to dCom_4, the latch signals LAT_1 to LAT_4, the clock signal CLK, and the change signals CNG_1 to CNG_4 are synchronized with the timing signal PTS. Among the signals, the waveform specifying signals dCom_k are input to the drive signal generation circuits 540_*k*, while the control signals SI_k, the latch signals LAT_k, the clock signal CLK, and the change signals CNG_k are input to switch circuits 340 of the liquid ejection units 300_*k*. In this case, k represents the integers from 1 to 4. In the following description, each of the control signals SI_1 to SI_4 may be referred to as a control signal SI, each of the waveform specifying signals dCom_1 to dCom_4 may be referred to as a waveform specifying signal dCom, each of the latch signals LAT_1 to LAT_4 may be referred to as a LAT signal LAT, and each of the change signals CNG_1 to CNG_4 may be referred to as a change signal CNG.

The control signal SI is a digital signal specifying an operational state of each of the piezoelectric elements included in the head 310. Specifically, the control signal SI specifies whether a drive signal Com described later is to be supplied to each of the piezoelectric elements. For example, this specifying specifies whether the ink is to be ejected from each of the nozzles N corresponding to the piezoelectric elements, and specifies an amount of the ink to be ejected from each of the nozzles N. The waveform specifying signal dCom is a digital signal that defines a waveform of the drive signal Com. The latch signal LAT and the change signal CNG are used with the control signal SI and define the timing of driving each of the piezoelectric elements to define the timing of ejecting the ink from each of the nozzles N. More specifically, the latch signal LAT defines an ink ejection cycle Tu, and the change signal CNG is a signal that divides the single ejection cycle Tu defined by the latch signal LAT into a plurality of time periods. The clock signal CLK is a reference clock signal synchronized with the timing signal PTS. Among the signals described above, the signals to be input to the switch circuit 340 of the liquid ejection unit 300 are described later in detail.

The control circuit 530 includes a processor such as one or more central processing units (CPUs). The control circuit 530 may include a programmable logic device such as a field-programmable gate array (FPGA), instead of or in addition to the one or more CPUs.

The drive signal generation circuit 540 generates the drive signal Com that drives each of the piezoelectric elements included in the head 310. Specifically, the drive signal generation circuit 540 includes, for example, a DA conversion circuit and an amplifying circuit. The drive signal generation circuit 540 causes the DA conversion circuit to convert the waveform specifying signal dCom from the control circuit 530 from a digital signal to an analog signal and causes the amplifying circuit to amplify the analog signal using a power supply potential VHV from the power supply circuit 520 so as to generate the drive signal Com. A signal of a waveform that is included in a waveform included in the drive signal Com and is to be supplied to the piezoelectric elements is a drive pulse PD. The drive pulse PD is supplied from the drive signal generation circuit 540 to the piezoelectric elements via the switch circuit 340. The switch circuit 340 switches whether to supply, as the drive pulse PD, at least a part of the waveform included in the drive signal Com based on the control signal SI.

The computer 700 includes a function of supplying information such as the route information Da to the controller 600 and a function of supplying information such as the print data Img to the control module 500. As the computer 700, for example, a personal computer can be used.

1-3. Operation of Three-Dimensional Printing Device 100 and Three-Dimensional Printing Method In the first embodiment, the three-dimensional printing device 100 performs the printing operation of moving the heads 310 from the X2 direction toward the X1 direction by the linear motion mechanism 220 while ejecting the ink from the heads 310. During the printing operation, the workpiece support mechanism 900 is not driven. To simplify the description, the present embodiment exemplifies a case where the surface WF of the workpiece W that is to be printed includes an inclined region R1 and a flat region R2. The inclined region R1 is a flat surface inclined with respect to an XY plane. The flat region R2 is a flat surface parallel to the XY plane. In a mode in which an ejection cycle Tu in which ink is ejected onto the inclined region R1 is the same as an ejection cycle Tu in which ink is ejected onto the flat region R2, there is a problem that a resolution in the inclined region R1 is lower than a resolution in the flat region R2 and that the quality of an image formed on the surface WF decreases. In the first embodiment, an ejection cycle Tu in which the ink is ejected onto the inclined region R1 is set to be shorter than an ejection cycle Tu in which the ink is ejected onto the flat region R2 and thus a resolution in the inclined region R1 is equal to or nearly equal to a resolution in the flat region R2.

To simplify the description, a difference between an ejection cycle Tu of the head 310_1 and an ejection cycle Tu of the head 310_4 when the surface WF of the workpiece W includes the inclined region R1 and the flat region R2 is described below. In the following description, ejection cycles Tu of the heads 310_*k* may be referred to as ejection cycles Tu_k.

The inclined region R1 is an example of a "first region". The flat region R2 is an example of a "second region". In addition, the ejection cycle Tu in which the ink is ejected onto the inclined region R1 is an example of a "first ejection cycle". The ejection cycle Tu in which the ink is ejected onto the flat region R2 is an example of a "second ejection cycle". In the following description, the ejection cycle Tu in which the ink is ejected onto the inclined region R1 may be referred to as a first ejection cycle TuA, and the ejection cycle Tu in which the ink is ejected onto the flat region R2 may be referred to as a second ejection cycle TuB.

Figure 5:
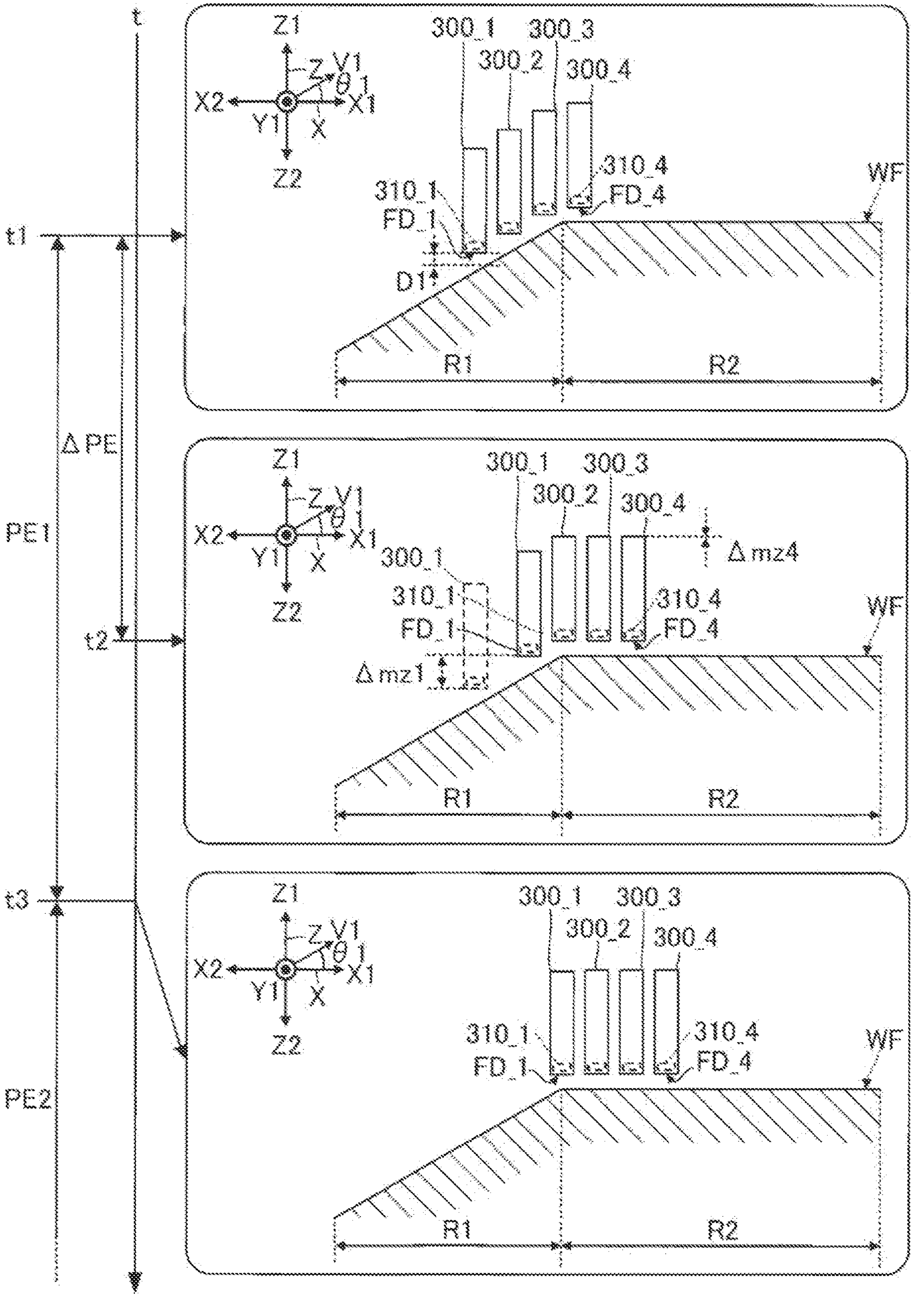
FIG. 5 is a diagram describing the positions of heads during a printing operation.

FIG. 5 is a diagram describing the positions of the heads 310 during the printing operation. As illustrated in FIG. 5, the surface WF of the workpiece W includes the inclined region R1 and the flat region R2. The inclined region R1 is adjacent to the flat region R2. The inclined region R1 is more inclined with respect to the X axis than the flat region R2 as viewed along the Y axis. In the example illustrated in FIG. 5, the inclined region R1 extends in a V1 direction. As viewed from the Y1 direction toward the Y2 direction, the V1 direction is a direction obtained by counterclockwise rotating the X1 direction by an angle θ1. The angle θ1 is greater than 0 degrees and less than 90 degrees.

A execution period of the printing operation includes a first time period PE1 and a second time period PE2. The first time period PE1 is a time period when the nozzle array L of the head 310_1 faces the inclined region R1 and the nozzle array L of the head 310_4 faces the flat region R2 during the execution of movement by the linear motion mechanism 220. The fact that the nozzle arrays L face the regions means that the nozzle arrays L overlap the regions as viewed along the Z axis. In the example illustrated in FIG. 5, the first time period PE1 is from time t1 to time t3. The first time period PE1 includes time t2. The second time period PE2 is a time period when the nozzle array L of the head 310_1 faces the flat region R2 during the execution of the movement by the linear motion mechanism 220. The second time period PE2 is after the first time period PE1. In the example illustrated in FIG. 5, the second time period PE2 starts from the time t3.

As illustrated in FIG. 5, in the printing operation, a distance D1 between each of the heads 310 and the surface WF in the Z axis direction is maintained in a predetermined range. When the distances D1 are not appropriately maintained, flight distances of the ink ejected by the heads 310 may become longer and the accuracy of positions where the ink has landed on the workpiece W may decrease. To appropriately maintain the distances D1, the individual elevating mechanisms 235_*k* move the nozzle surfaces FD_k toward the Z2 direction. In this case, k represents the integers from 1 to 4.

In addition, when the energy emitting unit is mounted on the carriage 222, a distance between an emission surface of the energy emitting unit and the surface WF is maintained in an appropriate range. When this distance is not appropriately maintained, energy emitted from the energy emitting unit may be attenuated and ink may be insufficiently cured.

To calculate the ejection cycle Tu in which the ink is ejected onto the flat region R2 with respect to the ejection cycle Tu in which ink the is ejected onto the inclined region R1, the control circuit 530 calculates a movement amount m4 of the nozzle surface FD_4 with respect to a movement amount m1 of the nozzle surface FD_1 in a certain time period before the current time. The certain time period may be any time period. However, even when the inclination of the surface WF of the workpiece W is changed, as the certain time period is closer to the current time and is shorter, it becomes easier for the heads 310 to follow the inclination of the surface WF. Therefore, the resolutions on the surface WF can be made uniform. The following describes a case where the certain time period is a time period ΔPE from the time t1 to the time t2.

In a frame illustrated in FIG. 5 and corresponding to the time t2, the liquid ejection unit 300_1 at the time t1 is indicated by a broken line, and an amount Δmz1 of movement of the nozzle surface FD_1 by the individual elevating mechanism 235_1 in the Z axis direction in the time period ΔPE is indicated. On the other hand, in the time period ΔPE, the individual elevating mechanism 235_4 hardly moves the head 310_4. Therefore, an amount Δmz4 of movement of the nozzle surface FD_4 by the individual elevating mechanism 235_4 in the Z axis direction in the time period ΔPE is substantially zero. In the time period ΔPE, the amount Δmz1 of movement of the nozzle surface FD_1 by the individual elevating mechanism 235_1 is larger than the amount Δmz4 of movement of the nozzle surface FD_4 by the individual elevating mechanism 235_4.

In the time period ΔPE, the movement amount of the nozzle surface FD_1 is larger than the movement amount of the nozzle surface FD_4. Specifically, a movement amount Δm1 of the nozzle surface FD_1 in the time period ΔPE is expressed by the following Equation (1).

Equation (1)

$$\Delta m1=\sqrt{\Delta mz1^2+\Delta mx} \tag{1}$$

Δmz1 is a value proportional to the number of pulses of the output signal Dz_1 obtained in the time period ΔPE. Δmx is a movement amount of the nozzle surface FD_1 along the X axis in the time period ΔPE. Δmx is a value proportional to the number of pulses of the output signal Dx obtained in the time period ΔPE. Similarly, a movement amount Δm4 of the nozzle surface FD_4 in the first time period PE1 is expressed by the following Equation (2). The movement amount of the nozzle surface FD_1 along the X axis in the time period ΔPE is equal to the movement amount of the nozzle surface FD_4 along the X axis in the time period ΔPE. The number of pulses of the output signal Dx is an example of the "number of pulse signals".

Equation (2)

$$\Delta m4=\Delta mz4^2+\Delta mx^2 \tag{2}$$

However, since Δmz4 is substantially zero, Equation (2) can be transformed into Equation (3).

Equation (3)

$$\Delta m4=\Delta mx \tag{3}$$

Therefore, the movement amount Δm4 of the nozzle surface FD_4 with respect to the movement amount Δm1 of the nozzle surface FD_1 is expressed by the following Equation (4).

Equation (4)

$$\Delta m4/\Delta m1=\frac{\Delta mx}{\sqrt{\Delta mz1^2+\Delta mx^2}} \tag{4}$$

To cause the resolution in the inclined region R1 to be equal to or nearly equal to the resolution in the flat region R2, the control circuit 530 determines the ejection cycle Tu_1 of the head 310_1 such that the ejection cycle Tu_1 of the head 310_1 is Δm4/Δm1 of the ejection cycle Tu_4 of the head 310_4. Δm4/Δm1 is a value greater than 0 and less than 1. That is, the ejection cycle Tu_1 is set to be shorter than the ejection cycle Tu_4. As described above, since the ejection cycle Tu in which the ink is ejected onto the inclined region R1 is the first ejection cycle TuA, the ejection cycle Tu_1 in the first time period PE1 is the first ejection cycle TuA. Similarly, since the ejection cycle Tu in which the ink is ejected onto the flat region R2 is the second ejection cycle TuB, the ejection cycle Tu_4 in the first time period PE1 is the second ejection cycle TuB. The ejection cycle Tu_1 in the second time period PE2 is the second ejection cycle TuB. For example, when a resolution of 600 dots per inch (dpi) is achieved as a reference resolution in the flat region R2, an interval between two dots in the flat region R2 is approximately 42 micrometers. Therefore, it suffices for an interval between two dots in the inclined region R1 as viewed along the Z axis to be approximately 42 micrometers×Δm4/Δm1. To calculate Δm4/Δm1 using Equation (4), the control circuit 530 may substitute the number of pulses of the output signal Dz_1 obtained in the time period ΔPE into Δmz1 and substitute the number of pulses of the output signal Dx obtained in the time period ΔPE into Δmx. Then, the control circuit 530 determines the ejection cycle Tu_1 of the head 310_1 such that the ejection cycle Tu_1 of the head 310_1 is a time period obtained by multiplying Δm4/Δm1 by a time period required for the head 310_1 to move by the interval between two dots according to the reference resolution in the flat region R2. That is, the ejection cycle Tu_1 is defined based on the output signal Dx and the output signal Dz_1. In addition, the ejection Tu_4 is defined based on the output signal Dx and the output signal Dz_4. An example of the ejection cycles Tu of the heads 310 when the ejection cycles Tu of the heads 310 are changed is described with reference to FIG. 6.

Figure 6:
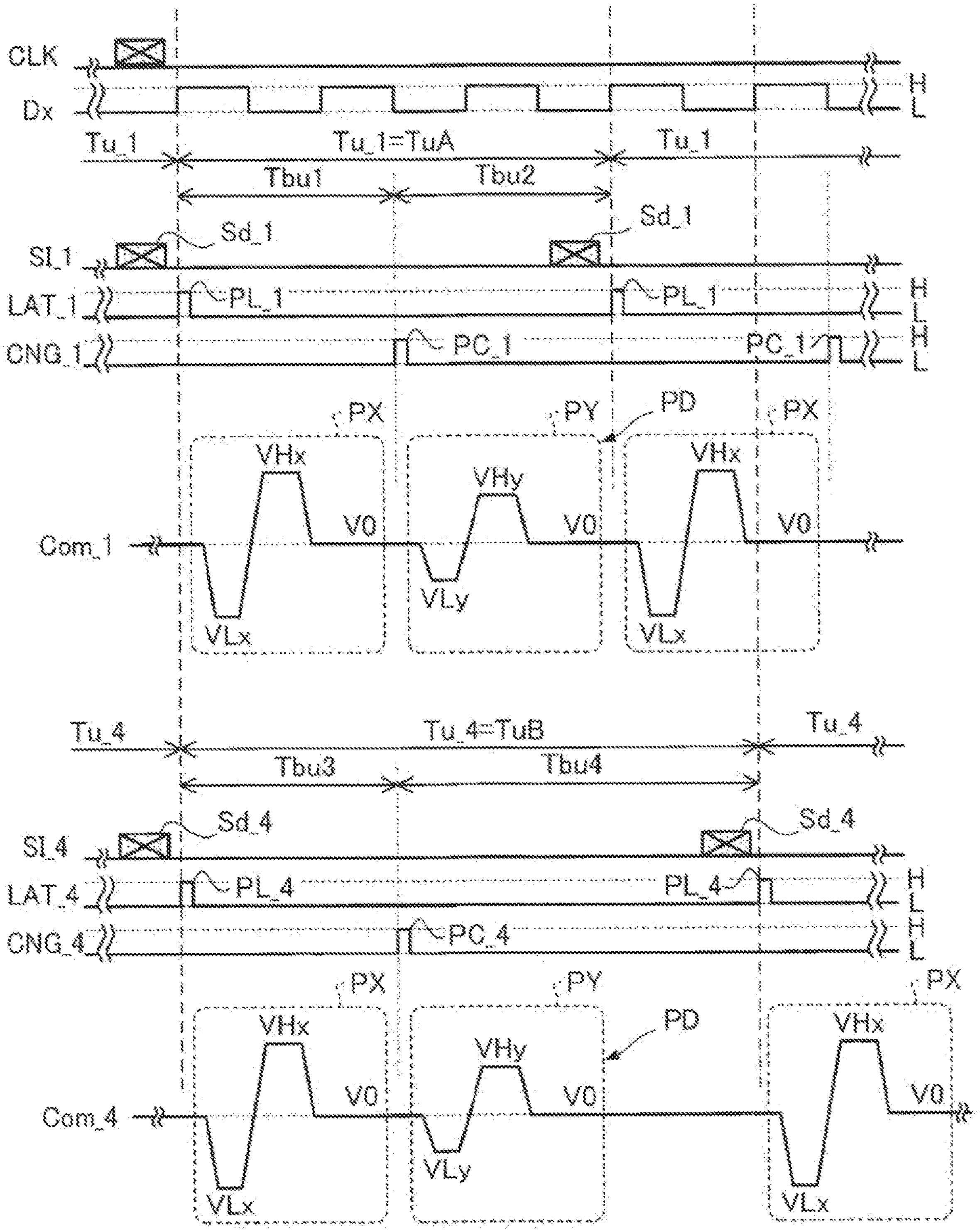
FIG. 6 is a timing chart describing ejection cycles of the heads.

FIG. 6 is a timing chart describing the ejection cycles Tu of the heads 310. In the example illustrated in FIG. 6, a case where Δm4/Δm1 is ¾ is described to simplify the description. In the example illustrated in FIG. 6, the control circuit 530 determines, as the ejection cycle Tu_1 of the head 310_1, a time period defined by 3 pulses of the output signal Dx from the linear motion encoder 223, and determines, as the ejection cycle Tu_4 of the head 310_4, a time period defined by 4 pulses of the output signal Dx.

The control circuit 530 outputs the latch signal LAT_1 including a pulse PL_1 indicating the ejection cycle Tu_1 to the liquid ejection unit 300_1. That is, the latch signal LAT_1 is output at time defined by the 3 pulses of the output signal Dx. The ejection cycle Tu_1 is defined as a time period from the rising edge of the pulse PL_1 to the rising edge of the next pulse PL_1. The control circuit 530 outputs the change signal CNG_1 to the liquid ejection unit 300_1. The change signal CNG_1 includes a pulse PC_1 for dividing the single ejection cycle Tu_1 into a control period Tbu1 and a control period Tbu2. The control period Tbu1 is, for example, a time period from the rising edge of the pulse PL_1 to the rising edge of the pulse PC_1. The control period Tbu2 is, for example, a time period from the rising edge of the pulse PC_1 to the rising edge of the next pulse PL_1.

In addition, the control circuit 530 outputs the control signal SI_1 to the liquid ejection unit 300_1 in each ejection cycle Tu_1. That is, the control signal SI_1 is output at time defined by 3 pulses of the output signal Dx. The control signal SI_1 includes individual specifying signals Sd_1 specifying a type of an operation of the plurality of piezoelectric elements included in the head 310_1. The control signal SI_1 includes the number of individual specifying signals Sd_1 corresponding to the number of piezoelectric elements included in the head 310_1. In the following description, individual specifying signals Sd included in each of the control signals SI_k may be referred to as individual specifying signals Sd_k. In addition, each of the individual specifying signals Sd_1 to Sd_4 may be referred to as an individual specifying signal Sd.

In addition, the control circuit 530 outputs the latch signal LAT_4 including a pulse PL_4 indicating the ejection cycle Tu_4 to the liquid ejection unit 300_4. That is, the latch signal LAT_4 is output at time defined by the 4 pulses of the output signal Dx. The control circuit 530 outputs the change signal CNG_4 to the liquid ejection unit 300_4. The change signal CNG_4 includes a pulse PC_4 for dividing the single ejection cycle Tu_4 into a control period Tbu3 and a control period Tbu4. The control period Tbu3 is, for example, a time period from the rising edge of the pulse PL_4 to the rising edge of the pulse PC_4. The control period Tbu4 is, for example, a time period from the rising edge of the pulse PC_4 to the rising edge of the next pulse PL_4.

In addition, the control circuit 530 outputs the control signal SI_4 to the liquid ejection unit 300_4 in each ejection cycle Tu_4. That is, the control signal SI_4 is output at time defined by 4 pulses of the output signal Dx. The control signal SI_4 includes individual specifying signals Sd_4 specifying a type of an operation of the plurality of piezoelectric elements included in the head 310_4. The control signal SI_4 includes the number of individual specifying signals Sd_4 corresponding to the number of piezoelectric elements included in the head 310_4.

In the above-described manner, it is possible to change the ejection cycles Tu for each of the heads 310 by adjusting, for each of the heads 310, the number of pulses of the output signal Dx defining the timing of the latch signals LAT and the timing of the control signals SI.

As illustrated in FIG. 6, the drive signal Com_1 includes a waveform PX in the control period Tbu1 and includes a waveform PY in the control period Tbu2, and the drive signal Com_4 includes a waveform PX in the control period Tbu3 and includes a waveform PY in the control period Tbu4. In the example illustrated in FIG. 6, the difference between the highest potential VHX and the lowest potential VLX in the waveform PX of each of the drive signals Com_1 and Com_4 is greater than the difference between the highest potential VHY and the lowest potential VLY in the waveform PY of each of the drive signals Com_1 and Com_4. The waveforms of the drive signals Com are not limited to the example illustrated in FIG. 6. For example, the waveforms PY may be omitted.

A mode in which ink is ejected according to details of the individual specifying signals Sd is described. In the present embodiment, each of the individual specifying signals Sd is a value specifying any one of a large dot, a middle dot, a small dot, and non-ejection. For example, when an individual specifying signal Sd_1 is a value specifying the formation of a middle dot, the switch circuit 340 is on for the control period Tbu1 and is off for the control period Tbu2. Therefore, only the waveform PX of the drive signal Com_1 is supplied as a drive pulse PD to a corresponding piezoelectric element to eject ink in an amount corresponding to the middle dot.

In the above-described manner, it is possible to determine whether an ink droplet is ejected and change the size of an ink droplet by specifying whether the waveform PX is supplied to each piezoelectric element and whether the waveform PY is supplied to each piezoelectric element according to the details of the individual specifying signals Sd. Although the description is made using the example of the drive signal Com_1, the drive signal Com_4 is the same as or similar to the drive signal Com_1.

Figure 7:
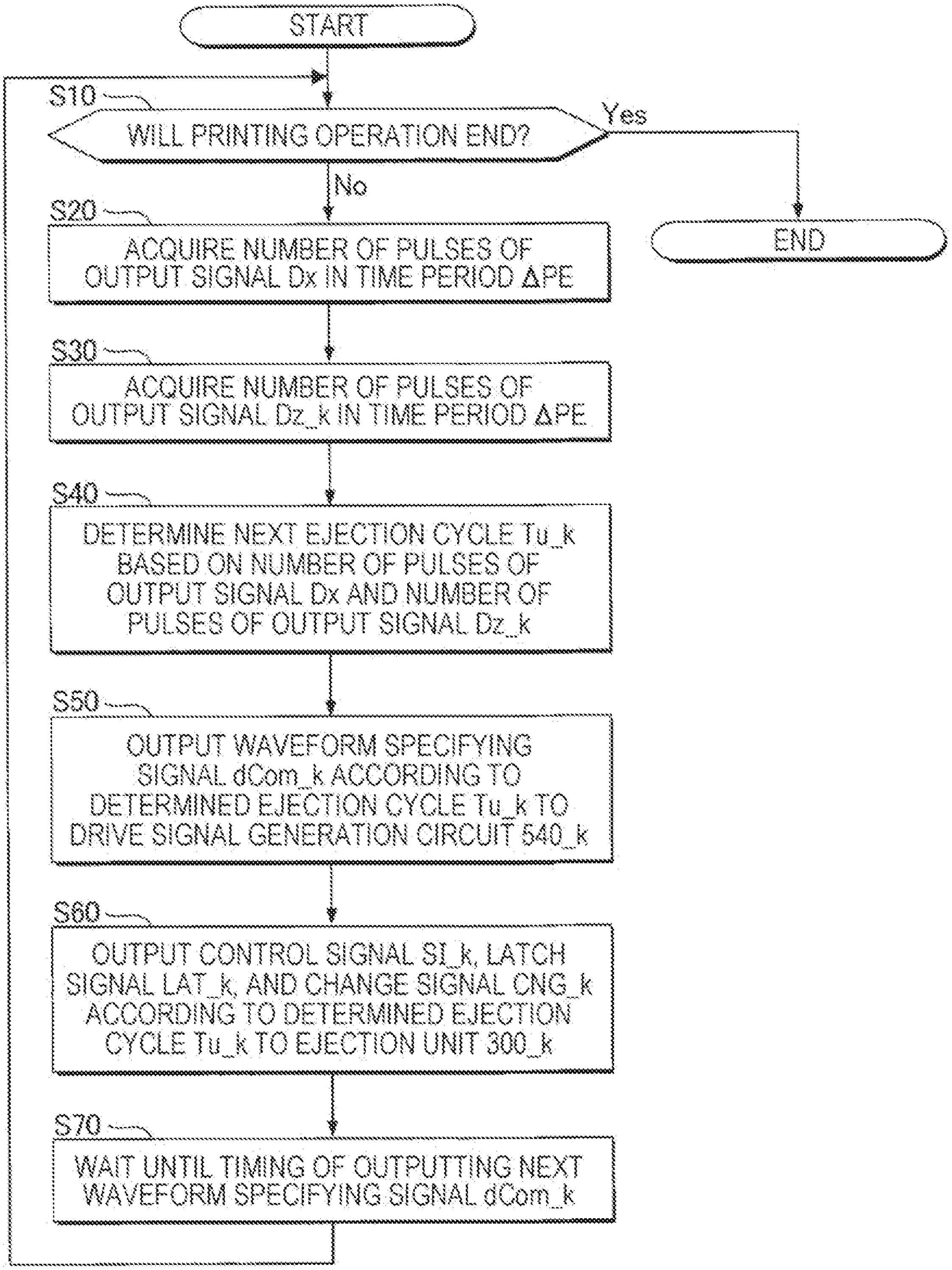
FIG. 7 is a flowchart illustrating a process relating to control of the liquid ejection units by a control circuit in a three-dimensional printing method.

FIG. 7 is a flowchart illustrating a process relating to the control of the liquid ejection units 300 by the control circuit 530 in the three-dimensional printing method. The control circuit 530 performs a series of processes illustrated in FIG. 7 on each of the heads 310_*k*. In this case, k represents the integers from 1 to 4. The series of processes illustrated in FIG. 7 is a process of determining the next ejection cycle Tu of each ejection cycle Tu.

In step S10, the control circuit 530 determines whether the printing operation will end. The printing operation ends when the head 310_*k* reaches a printing end position or when the user of the three-dimensional printing device 100 instructs the three-dimensional printing device 100 to stop the printing operation. When the answer to the determination in step S10 is Yes, the control circuit 530 ends the process illustrated in FIG. 7.

When the answer to the determination in step S10 is No, the control circuit 530 acquires the number of pulses of the output signal Dx in the time period ΔPE based on the output signal Dx output by the linear motion encoder 223 in step S20. In addition, in step S30, the control circuit 530 acquires the number of pulses of the output signal Dz_k in the time period ΔPE based on the output signal Dz_k output by the elevation encoder 236_*k*.

After the end of the process of step S30, the control circuit 530 determines the next ejection cycle Tu_k based on the number of pulses of the output signal Dx and the number of pulses of the output signal Dz_k in step S40. Specifically, the control circuit 530 determines the next ejection cycle Tu_k such that the next ejection cycle Tu_k is a value obtained by multiplying Δm4/Δm1 calculated according to Equation (4) by a time period required for the head 310_*k* to move by the dot interval according to the reference resolution in the flat region R2.

After the end of the process of step S40, the control circuit 530 outputs the waveform specifying signal dCom_k according to the determined ejection cycle Tu_k to the drive signal generation circuit 540_*k* in step S50. In addition, the control circuit 530 outputs the control signal SI_k, the latch signal LAT_k, and the change signal CNG_k according to the determined ejection cycle Tu_k to the liquid ejection unit 300_*k* in step S60.

After the end of the process of step S60, the control circuit 530 waits until the timing of outputting the next waveform specifying signal dCom_k in step S70 and causes the process to return to step S10. The timing of outputting the next waveform specifying signal dCom_k is a point of time before the determined ejection cycle Tu_k expires and when the next waveform specifying signal dCom_k, the control signal SI_k, the latch signal LAT_k, and the change signal CNG_k can be output without delay even when steps S20 to S60 are performed after the expiration of the timing.

1-4. Conclusion of First Embodiment

The conclusion of the first embodiment is described below using an example in which the head 310_1 corresponds to the "first head" and the head 310_4 corresponds to the "second head".

The three-dimensional printing device 100 includes the head 310_1 having the nozzle array L that ejects the ink, the head 310_4 having the nozzle array L that ejects the ink, and the moving mechanism 200 having the linear motion mechanism 220 that changes relative positions of the heads 310_1 and 310_4 with respect to the three-dimensional workpiece W along the X axis. The workpiece W includes the inclined region R1 and the flat region R2 adjacent to the inclined region R1. The inclined region R1 is more inclined with respect to the X axis than the flat region R2 as viewed along the Y axis intersecting the X axis. A time period when the nozzle array L of the head 310_1 faces the inclined region R1 and the nozzle array L of the head 310_4 faces the flat region R2 during the execution of movement by the linear motion mechanism 220 is the first time period PE1. In the first time period PE1, the nozzle array L of the head 310_1 ejects the ink onto the inclined region R1 in the ejection cycle Tu_1. In addition, in the first time period PE1, the nozzle array L of the head 310_4 ejects the ink onto the flat region R2 in the ejection cycle Tu_4. The ejection cycle Tu_1 is shorter than the ejection cycle Tu_4.

As described above, in the mode in which the ejection cycle Tu in which the ink is ejected onto the inclined region R1 is the same as the ejection cycle Tu in which the ink is ejected onto the flat region R2, there is the problem that the resolution in the inclined region R1 is lower than the resolution in the flat region R2 and that the quality of the image formed on the surface WF decreases. In the present embodiment, the resolution in the inclined region R1 can be equal to or nearly equal to the resolution in the flat region R2 by setting the ejection cycle Tu_1 to be shorter than the ejection cycle Tu_4, compared with the mode in which the ejection cycle Tu in which the ink is ejected onto the inclined region R1 is the same as the ejection cycle Tu in which the ink is ejected onto the flat region R2.

To simplify the description, the present embodiment exemplifies the case where the surface WF of the workpiece W to be printed includes the inclined region R1, which is a flat surface inclined with respect to the XY plane, and the flat region R2, which is a flat surface parallel to the XY plane. However, the present disclosure is not limited thereto. The surface WF of the workpiece W may be a curved surface. When the surface WF is the curved surface, it is possible to approximate the curved surface using a plurality of flat surfaces obtained by appropriately dividing the curved surface and classify the plurality of flat surfaces into an inclined region R1 and a flat region R2 based on inclinations of the flat surfaces with respect to the X axis as viewed along the Y axis. The flat region R2 may not be a surface parallel to the X axis and the Y axis. In addition, when the surface WF is the curved surface, it is preferable that the ejection cycles Tu be sequentially changed according to the movement of the carriage 222. In order to compare the ejection cycles Tu in each time period, it is possible to use an average value or the like of the ejection cycles Tu that are sequentially changed.

In addition, when a time period when the nozzle array L of the head 310_1 faces the flat region R2 during the execution of the movement by the linear motion mechanism 220 is the second time period PE2, the nozzle array L of the head 310_1 ejects the ink onto the flat region R2 in the second ejection cycle Tub in the second time period PE2.

In the time period when the nozzle array L of the head 310_1 faces the flat region R2, the head 310_1 performs printing on the inclined region R1 and the flat region R2 by ejecting the ink from the nozzle array L of the head 310_1 in the second ejection cycle TuB, and thus the resolution in the inclined region R1 can be equal to or nearly equal to the resolution in the flat region R2.

The nozzle array L of the head 310_1 is provided in the nozzle surface FD_1 of the head 310_1, while the nozzle array L of the head 310_4 is provided in the nozzle surface FD_4 of the head 310_4. The moving mechanism 200 includes the individual elevating mechanism 235_1 that is moved by the linear motion mechanism 220 to move the nozzle surface FD_1 along the Z axis intersecting the X axis and the Y axis, and the individual elevating mechanism 235_4 that is moved by the linear motion mechanism 220 to move the nozzle surface FD_4 along the Z axis.

Since the heads 310 are moved up and down by the separate individual elevating mechanisms 235, the heads 310 can be inserted into a deeper recess of the workpiece W, compared with a mode in which the heads 310_1 to 310_4 are moved up and down by a single individual elevating mechanism 235. Therefore, it is possible to eject the ink at an appropriate distance while suppressing contact with the workpiece W and thus improve the quality of printing.

In addition, in the first time period PE1, the amount Δmz1 of movement of the nozzle surface FD_1 by the individual elevating mechanism 235_1 is larger than the amount Δmz4 of movement of the nozzle surface FD_4 by the individual elevating mechanism 235_4.

Since the inclined region R1 is more inclined with respect to the X axis than the flat region R2 as viewed along the Y axis, the head 310_1 can follow the inclined region R1 by setting the movement amount Δmz1 to be larger than the movement amount Δmz4.

In addition, it can be said that the three-dimensional printing device 100 includes the head 310_1 having the nozzle surface FD_1 in which the nozzle array L that ejects the ink is provided, the head 310_4 having the nozzle surface FD_4 in which the nozzle array L that ejects the ink is provided, and the moving mechanism 200 having the linear motion mechanism 220 that changes relative positions of the heads 310_1 and 310_4 with respect to the three-dimensional workpiece W along the X axis. The moving mechanism 200 includes the individual elevating mechanism 235_1 that is moved by the linear motion mechanism 220 to move the nozzle surface FD_1 along the Z axis intersecting the X axis and Y axis, and the individual elevating mechanism 235_4 that is moved by the linear motion mechanism 220 to move the nozzle surface FD_4 along the Z axis. A predetermined time period during the execution of the movement by the linear motion mechanism 220 is the first time period PE1. When a cycle in which the nozzle array L provided in the nozzle surface FD_1 ejects the ink is the first ejection cycle TuA in the first time period PE1, and a cycle in which the nozzle array L provided in the nozzle surface FD_4 ejects the ink is the second ejection cycle TuB in the first time period PE1, the amount Δmz1 of movement of the nozzle surface FD_1 along the Z axis in the first time period PE1 is larger than the amount Δmz4 of movement of the nozzle surface FD_4 along the Z axis in the first time period PE1, and the first ejection cycle TuA is shorter than the second ejection cycle TuB.

According to the first embodiment, it is possible to suppress a decrease in the resolution of an image formed on the surface WF by driving, at a high frequency, the plurality of heads 310 that are greatly moved up and down by the linear motion mechanism 220.

In addition, during the execution of the movement by the linear motion mechanism 220, the nozzle array L of the head 310_1 ejects the ink in the second ejection cycle TuB in the second time period PE2 that is after the first time period PE1.

In a time period when the nozzle array L of the head 310_1 faces the flat region R2, it is possible to set resolutions in the flat region R2 to be uniform by causing the head 310_1 to eject the ink from the nozzle array L of the head 310_1 in the second ejection cycle TuB.

The workpiece W includes the inclined region R1 and the flat region R2 adjacent to the inclined region R1. The inclined region R1 is more inclined with respect to the X axis than the flat region R2 as viewed along the Y axis intersecting the X axis and the Z axis. In the first time period PE1, the nozzle array L of the head 310_1 faces the inclined region R1 and the nozzle array L of the head 310_4 faces the flat region R2.

In the first embodiment, the resolution in the inclined region R1 can be equal to or nearly equal to the resolution in the flat region R2 by setting the ejection cycle Tu_1 in which the ink is ejected onto the inclined region R1 to be shorter than the ejection cycle Tu_4 in which the ink is ejected onto the flat region R2, compared with the mode in which the ejection cycle Tu in which the ink is ejected onto the inclined region R1 is the same as the ejection cycle Tu in which the ink is ejected onto the flat region R2.

The moving mechanism 200 includes the linear motion encoder 223 that outputs the output signal Dx according to amounts of relative movement of the heads 310_1 and 310_4 with respect to the workpiece W along the X axis, the elevation encoder 236_1 that outputs a signal according to an operational amount of the individual elevating mechanism 235_1, and the elevation encoder 236_4 that outputs a signal according to an operational amount of the individual elevating mechanism 235_4. In the first time period PE1, the first ejection cycle TuA is defined based on the output signal Dx of the linear motion encoder 223 and the output signal Dz_1 of the elevation encoder 236_1, and the second ejection cycle TuB is defined based on the output signal Dx of the linear motion encoder 223 and the output signal Dz_4 of the elevation encoder 236_4.

Since the first ejection cycle TuA is defined based on the output signal Dx and the output signal Dz_1, each of the ejection cycles Tu can be set to a time length according to the inclination of the workpiece W and thus can be set to an appropriate ejection cycle Tu.

2. Second Embodiment

In the three-dimensional printing method according to the first embodiment, the ejection cycles Tu_k are defined based on the output signal Dx of the linear motion encoder 223 and the output signals Dz_k of the elevation encoders 236_*k*. In this case, k represents the integers from 1 to 4. On the other hand, in a three-dimensional printing method according to a second embodiment, ejection cycles Tu_k are defined based on an output signal Dx of the linear motion encoder 223 and are not based on output signals Dz_k. In this case, k represents the integers from 1 to 4. This feature is different from the first embodiment.

2-1. Electrical Configuration of Three-Dimensional Printing Device 100*a*

Figure 8:
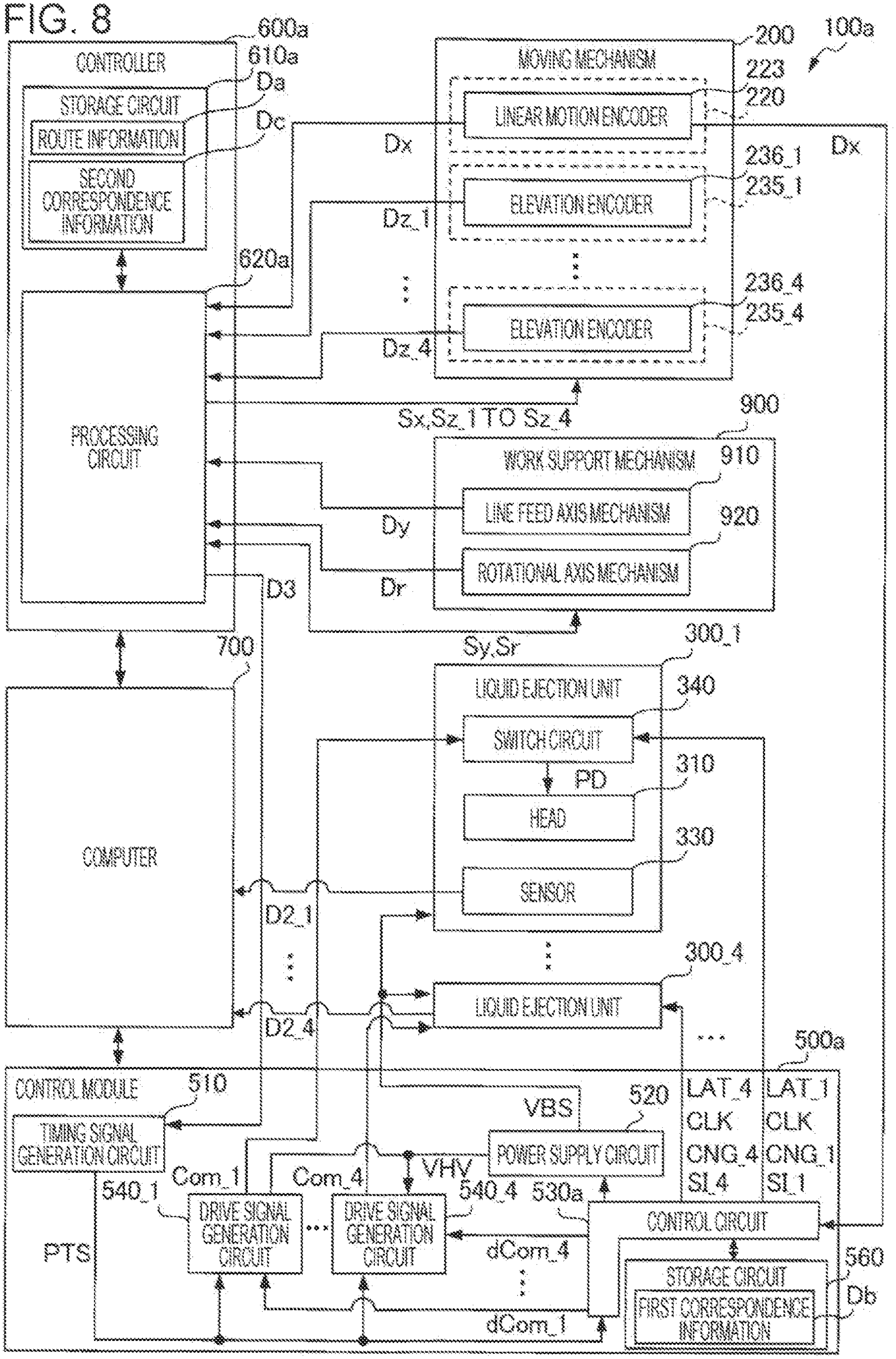
FIG. 8 is a block diagram illustrating an electrical configuration of a three-dimensional printing device according to a second embodiment.

FIG. 8 is a block diagram illustrating an electrical configuration of a three-dimensional printing device 100*a* according to the second embodiment. The three-dimensional printing device 100*a* is different from the three-dimensional printing device 100 in that the three-dimensional printing device 100*a* includes a control module 500*a* instead of the control module 500 and includes a controller 600*a* instead of the controller 600.

The control module 500*a* is different from the control module 500 in that the control module 500*a* includes a control circuit 530*a* instead of the control circuit 530 and includes a storage circuit 560. The control circuit 530*a* is different from the control circuit 530 in that output signals Dz_1 to Dz_4 are not input to the control circuit 530*a*.

The storage circuit 560 stores various programs to be executed by the control circuit 530*a* and various types of data to be processed by the control circuit 530*a*. The storage circuit 560 includes a semiconductor memory that is one or both of a volatile memory such as a RAM and a nonvolatile memory such as a ROM, an EEPROM, or a PROM. A part of the storage circuit 560 or the entire storage circuit 560 may be included in the control circuit 530*a*.

In the storage circuit 560, first correspondence information Db is stored. The first correspondence information Db indicates correspondence relationships between the number of pulses of the output signal Dx output by the linear motion encoder 223 and ejection cycles Tu of heads 310_1 to 310_4. A specific example of the first correspondence information Db is described with reference to FIG. 9.

FIG. 9 is a diagram illustrating an example of details of the first correspondence information Db. To simplify the description, the first correspondence information Db illustrated in FIG. 9 indicates only the ejection cycle Tu_1 of the head 310_1 and the ejection cycle Tu_4 of the head 310_4. The first correspondence information Db illustrated in FIG. 9 indicates relationships between the number of pulses of the output signal Dx, the ejection cycle Tu_1 of the head 310_1, and the ejection cycle Tu_4 of the head 310_4 when the workpiece W includes the inclined region R1 and the flat region R2 as illustrated in FIG. 5. CNT illustrated in FIG. 9 indicates the current number of pulses of the output signal Dx in a state in which the head 310_1 is currently positioned on the assumption that the number of pulses of the output signal Dx in a state in which the head 310_1 is positioned on the most X2 direction side of the inclined region R1 is 0. That is, CNT is a value indicating the cumulative number of pulses of the output signal Dx that is sequentially output as a carriage 222 is moved in the direction along the X axis. Pa illustrated in FIG. 9 indicates the number of pulses of the output signal Dx when the nozzle array L of the head 310_1 is positioned facing an end portion of the flat region R2 in the X2 direction. The first correspondence information Db illustrated in FIG. 9 indicates that, when the number CNT of pulses is equal to or greater than 0 and less than Pa, the ejection cycle Tu_1 of the head 310_1 is the first ejection cycle TuA and the ejection cycle Tu_4 of the head 310_4 is the second ejection cycle TuB. In addition, the first correspondence information Db illustrated in FIG. 9 indicates that, when the number CNT of pulses is equal to or greater than Pa, each of the ejection cycle Tu_1 of the head 310_1 and the ejection cycle Tu_4 of the head 310_4 is the second ejection cycle TuB.

As illustrated in FIG. 9, each of the ejection cycle Tu_1 of the head 310_1 and the ejection cycle Tu_4 of the head 310_4 is defined based on the number of pulses of the output signal Dx output by the linear motion encoder 223. In addition, the number of pulses of the output signal Dx for the head 310_1 to eject the ink in the first ejection cycle TuA is smaller than the number of pulses of the output signal Dx for the head 310_1 to eject the ink in the second ejection cycle TuB.

The description returns to FIG. 8. The controller 600*a* is different from the controller 600 in that the controller 600*a* includes a storage circuit 610*a* instead of the storage circuit 610 and includes a processing circuit 620*a* instead of the processing circuit 620.

The storage circuit 610*a* is different from the storage circuit 610 in that the storage circuit 610*a* stores second correspondence information Dc. The second correspondence information Dc indicates correspondence relationships between the number of pulses of the output signal Dx output by the linear motion encoder 223 and amounts of movement of the nozzle surfaces FD_1 to FD_4 by the individual elevating mechanisms 235_1 to 235_4. A specific example of the second correspondence information Dc is described with reference to FIG. 10.

FIG. 10 is a diagram illustrating an example of details of the second correspondence information Dc. To simplify the description, the second correspondence information Dc illustrated in FIG. 10 indicates only an amount of movement of the nozzle surface FD_1 along the Z axis and an amount of movement of the nozzle surface FD_4 along the Z axis. The second correspondence information Dc illustrated in FIG. 10 indicates relationships between the number of pulses of the output signal Dx, the movement amount of the nozzle surface FD_1, and the movement amount of the nozzle surface FD_4 when the workpiece W includes the inclined region R1 and the flat region R2 as illustrated in FIG. 5. Pa and CNT illustrated in FIG. 10 have the same meanings as Pa and CNT illustrated in FIG. 9. The second correspondence information Dc illustrated in FIG. 10 indicates that, when the number CNT of pulses is equal to or greater than 0 and less than Pa, the movement amount of the nozzle surface FD_1 is mz1 and the movement amount of the nozzle surface FD_4 is 0. In addition, the second correspondence information Dc illustrated in FIG. 10 indicates that, when the number CNT of pulses is equal to or greater than Pa, the movement amount of the nozzle surface FD_1 and the movement amount of the nozzle surface FD_4 are 0.

As illustrated in FIG. 10, operations of the individual elevating mechanisms 235_1 and 235_4 are defined based on the output signal Dx output by the linear motion encoder 223.

An example of the generation of the first correspondence information Db and the second correspondence information Dc is described below. The first correspondence information Db and the second correspondence information Dc may be generated by the processing circuit 620*a* or may be generated by the computer 700. Alternatively, the first correspondence information Db and the second correspondence information Dc may be generated by the control circuit 530*a* or may be generated by an external device of the three-dimensional printing device 100. An example in which the first correspondence information Db and the second correspondence information Dc are generated by the processing circuit 620*a* is described below. The timing of generating the first correspondence information Db and the second correspondence information Dc is before a printing operation.

The processing circuit 620*a* generates the first correspondence information Db and the second correspondence information Dc based on the workpiece information indicating the position of the workpiece W and the shape of the workpiece W. For example, the processing circuit 620*a* positions, based on the workpiece information, the workpiece W in a virtual three-dimensional space that simulates an XYZ space. The storage circuit 610*a* stores positional information indicating relative positions of the individual elevating mechanisms 235_1 to 235_4 with respect to the carriage 222. The processing circuit 620*a* positions the individual elevating mechanisms 235_1 to 235_4 in the virtual three-dimensional space based on the positional information according to each number of pulses of the output signal Dx. In addition, the processing circuit 620*a* positions the nozzle surfaces FD_1 and FD_4 in the virtual three-dimensional space such that a distance D1 between the surface WF and each of the heads 310_1 to 310_4 is in a predetermined range according to each number of pulses of the output signal Dx. The processing circuit 620*a* records, in the second correspondence information Dc, movement amounts of the nozzle surfaces FD_1 to FD_4 during the positioning of the nozzle surfaces FD_1 to FD_4 by the processing circuit 620*a*. In addition, the processing circuit 620*a* determines the ejection cycles Tu according to an inclination of a surface facing the nozzle arrays L of the heads 310_1 to 310_4 with respect to the X axis. When the number of pulses of the output signal Dx is a first number of pulses, and the nozzle array L of the head 310_1 is present at a position where the nozzle array L of the head 310_1 faces the inclined region R1, the processing circuit 620*a* determines, as the first ejection cycle TuA, the ejection cycle Tu_1 of the head 310_1 according to the first number of pulses. When the nozzle array L of the head 310_1 is present at a position where the nozzle array L of the head 310_1 faces the flat region R2, the processing circuit 620*a* determines, as the second ejection cycle TuB, the ejection cycle Tu_1 of the head 310_1 according to the first number of pulses. The same applies to the head 310_4. For example, when the number of pulses of the output signal Dx is the first number of pulses, and the nozzle array L of the head 310_4 is present at a position where the nozzle array L of the head 310_4 faces the flat region R2, the processing circuit 620*a* determines, as the second ejection cycle TuB, the ejection cycle Tu_4 of the head 310_4 according to the first number of pulses.

A case where the energy emitting unit is mounted on the carriage 222 is also described below. The storage circuit 610*a* stores positional information indicating a relative position of the individual elevating mechanism, which moves the energy emitting unit in the Z direction, with respect to the carriage 222. The processing circuit 620*a* positions the individual elevating mechanism based on the positional information according to each number of pulses of the output signal Dx. In addition, the processing circuit 620*a* positions the energy emitting unit in the virtual three-dimensional space according to each number of pulses of the output signal Dx such that a distance between the emitting surface of the energy emitting unit and the surface WF is an appropriate distance. The processing circuit 620*a* records, in the second correspondence information Dc, a movement amount of the emitting surface of the energy emitting unit during the positioning of the energy emitting unit by the processing circuit 620*a*.

The processing circuit 620*a* transmits the first correspondence information Db to the control module 500*a*. The control circuit 530*a* stores the first correspondence information Db to the storage circuit 560.

2-2. Operation of Three-Dimensional Printing Device 100*a* and Three-Dimensional Printing Method An operation of the three-dimensional printing device 100*a* is described with reference to FIGS. 11 and 12.

Figure 11:
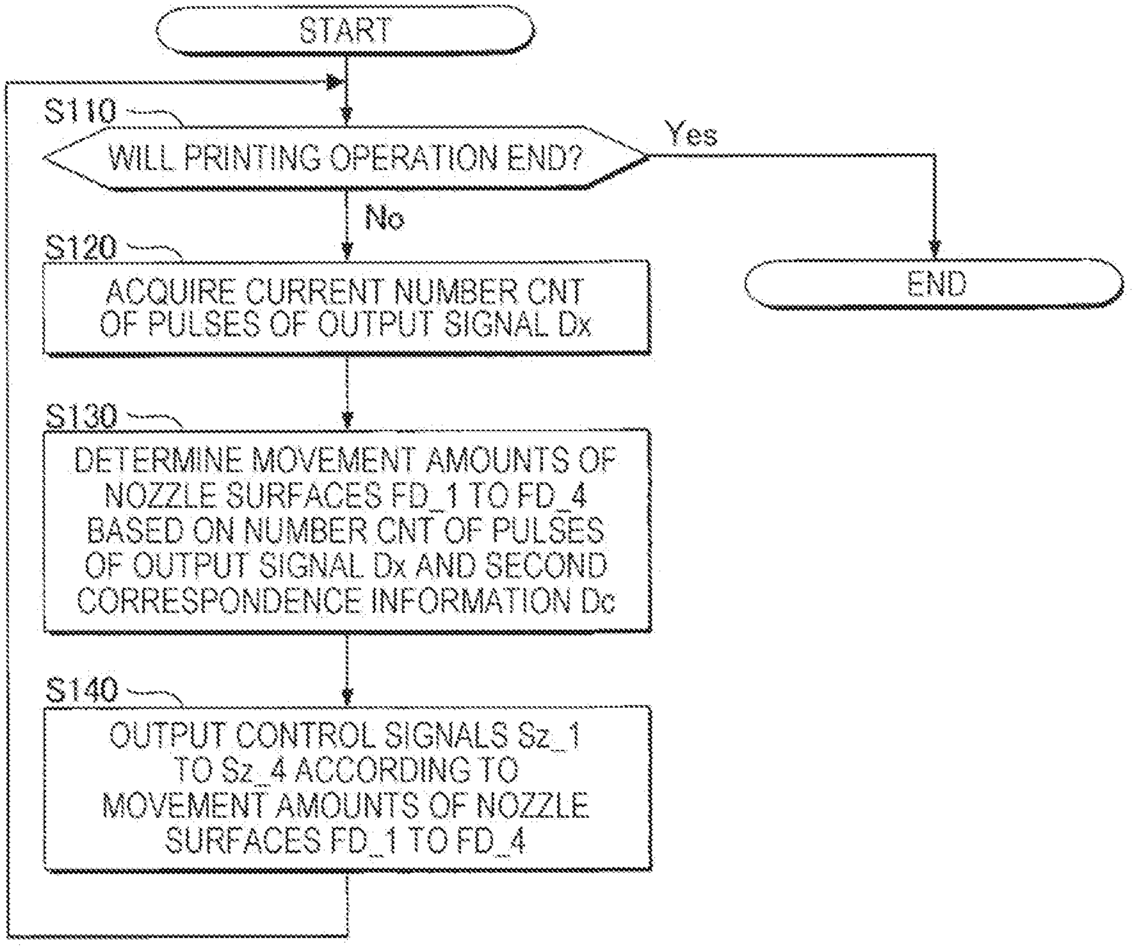
FIG. 11 is a flowchart illustrating a process by a processing circuit according to the second embodiment.

FIG. 11 is a flowchart illustrating a process relating to control of the individual elevating mechanisms 235 by the processing circuit 620*a* of the controller 600*a* according to the second embodiment. In step S110, the processing circuit 620*a* determines whether the printing operation will end. When the answer to the determination in step S110 is Yes, the processing circuit 620*a* ends the process illustrated in FIG. 11.

When the answer to the determination in step S110 is No, the processing circuit 620*a* acquires the current number CNT of pulses of the output signal Dx in step S120. Next, the processing circuit 620*a* determines movement amounts of the nozzle surfaces FD_1 to FD_4 based on the number CNT of pulses of the output signal Dx and the second correspondence information Dc in step S130.

When the head 310_1 is an example of the "first head", the movement amount of the nozzle surface FD_1 is an example of a "first movement amount". In addition, when the head 310_4 is an example of the "second head", the movement amount of the nozzle surface FD_4 is an example of a "second movement amount".

Then, the processing circuit 620*a* outputs control signals Sz_1 to Sz_4 according to the movement amounts of the nozzle surfaces FD_1 to FD_4 to the individual elevating mechanisms 235_1 to 235_4 in step S140.

Figure 12:
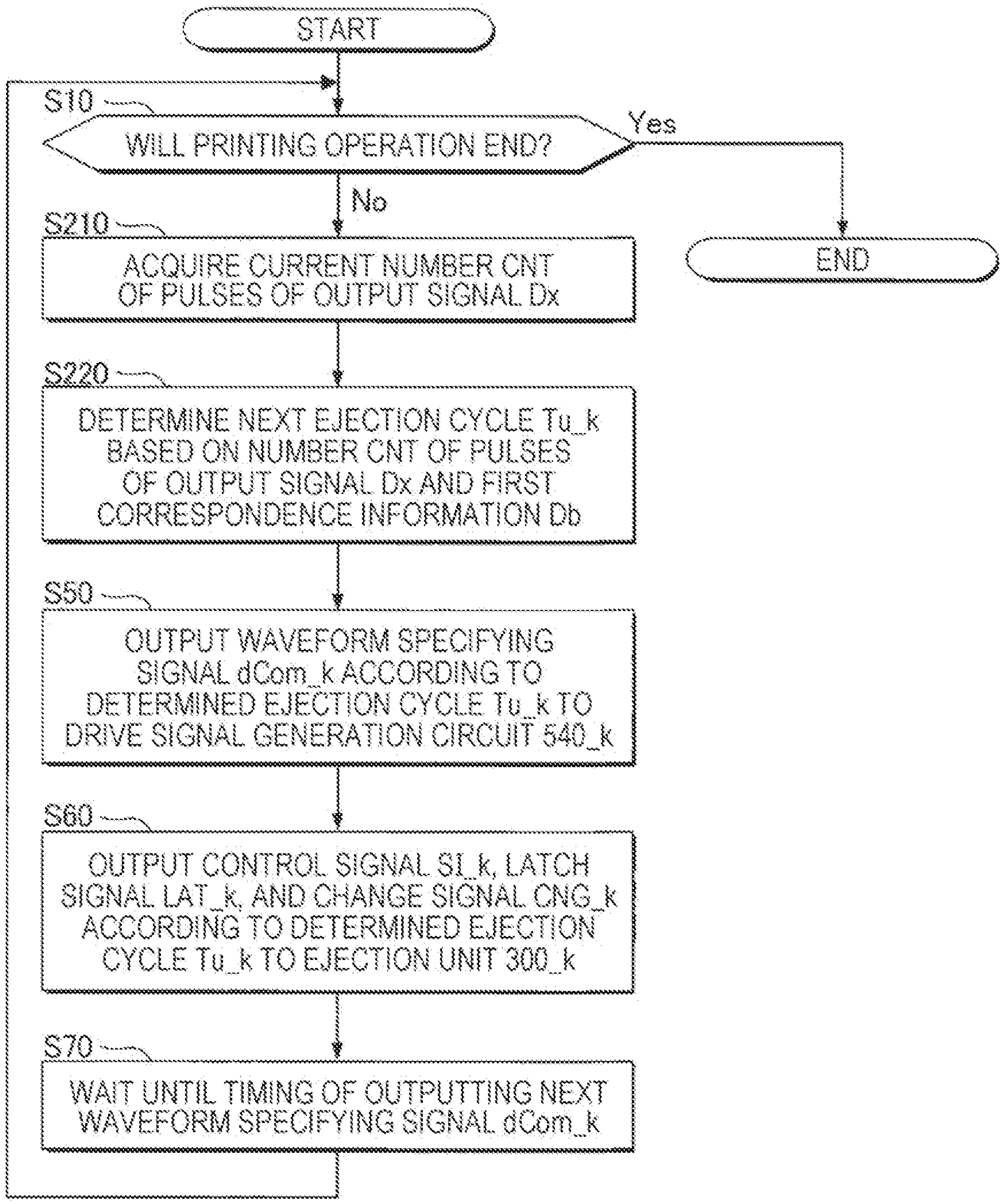
FIG. 12 is a flowchart illustrating a process relating to control of the liquid ejection units by a control circuit according to the second embodiment.

FIG. 12 is a flowchart illustrating a process relating to control of the liquid ejection units 300 by the control circuit 530*a* according to the second embodiment. The control circuit 530*a* performs a series of processes illustrated in FIG. 12 on each of the heads 310_*k*. In this case, k represents the integers from 1 to 4. However, the flowchart illustrated in FIG. 12 is different from the flowchart illustrated in FIG. 7 in that the processes of steps S20, S30, and S40 are not performed in the flowchart illustrated in FIG. 12 and that processes of steps S210 and S220 are performed in the flowchart illustrated in FIG. 12. The flowchart illustrated in FIG. 12 matches the flowchart illustrated in FIG. 7 with respect to the other processes. Therefore, only step S210 and step S220 are described below.

When the answer to the determination in step S10 is No, the control circuit 530*a* acquires the current number CNT of pulses of the output signal Dx in step S210. Next, the processing circuit 620*a* determines the next ejection cycle Tu_k based on the number CNT of pulses of the output signal Dx and the first correspondence information Db in step S220. After the end of the process of step S220, the control circuit 530*a* performs the process of step S50.

Although the control circuit 530*a* performs all the steps of the flowchart illustrated in FIG. 12, the present embodiment is not limited thereto. For example, the first correspondence information Db may be stored in the storage circuit 610*a*, and the processing circuit 620*a* may perform the process of step S210 and the process of step S220 and may notify the control module 500 of the determined ejection cycle Tu_k.

2-3. Conclusion of Second Embodiment

The conclusion of the second embodiment is described using an example in which the head 310_1 corresponds to the "first head" and the head 310_4 corresponds to the "second head".

The moving mechanism 200 includes the linear motion encoder 223 that outputs a pulse signal according to amounts of relative movement of the first head and the second head with respect to the workpiece W along the X axis.

Each of the first ejection cycle TuA and the second ejection cycle TuB is defined based on the number CNT of pulses of the output signal Dx output by the linear motion encoder 223. The number of pulses of the output signal for the head 310_1 to eject the ink in the first ejection cycle TuA is smaller than the number of pulses of the output signal for the head 310_1 to eject the ink in the second ejection cycle TuB.

According to the second embodiment, since the ejection cycles Tu, each of which corresponds to the number CNT of pulses, can be determined based on the first correspondence information Db, the ejection cycles Tu can be determined earlier by a time period required to execute Equation (4), compared with the first embodiment. That is, it is possible to reduce a time period required for the control circuit 530 to perform the calculation and reduce a time lag.

In addition, each of operations of the individual elevating mechanisms 235_1 and 235_4 is defined based on the number CNT of pulses of the output signal Dx output by the linear motion encoder 223.

According to the second embodiment, it is possible to appropriately determine movement amounts of the nozzle surfaces FD_1 to FD_4 according to the number CNT of pulses based on the second correspondence information Dc.

When the energy emitting unit is mounted on the carriage 222, it is preferable that an operation of the individual elevating mechanism that moves the energy emitting unit in the Z direction be defined based on the number CNT of pulses of the output signal Dx output by the linear motion encoder 223. According to this configuration, it is possible to appropriately determine the movement amount of the energy emitting unit according to the number CNT of pulses.

In addition, the control circuit 530*a* determines the first ejection cycle TuA and the second ejection cycle TuB based on the number CNT of pulses of the output signal Dx output by the linear motion encoder 223 and the first correspondence information Db. In the first time period PE1, the processing circuit 620*a* determines a movement amount of the nozzle surface FD_1 and a movement amount of the nozzle surface FD_4 based on the number CNT of pulses of the output signal Dx output by the linear motion encoder 223 and the second correspondence information Dc.

In the first time period PE1, the control circuit 530*a* performs a process of controlling the head 310_1 to cause the head 310_1 to eject the ink in the determined first ejection cycle TuA and a process of controlling the head 310_4 to cause the head 310_4 to eject the ink in the determined second ejection cycle TuB. The processing circuit 620*a* performs a process of controlling the individual elevating mechanism 235_1 to cause the individual elevating mechanism 235_1 to move the nozzle surface FD_1 by the determined movement amount of the nozzle surface FD_1 and a process of controlling the individual elevating mechanism 235_4 to cause the individual elevating mechanism 235_4 to move the nozzle surface FD_4 by the determined movement amount of the nozzle surface FD_4.

According to the second embodiment, it is possible to determine appropriate ejection cycles Tu based on the first correspondence information Db and control the individual elevating mechanisms 235 to move the nozzle surfaces FD by appropriate movement amounts based on the second correspondence information Dc.

In addition, the processing circuit 620*a* generates the first correspondence information Db and the second correspondence information Dc based on the workpiece information.

The first correspondence information Db and the second correspondence information Dc may be generated before the printing operation, and the three-dimensional printing device 100*a* may not calculate the ejection cycles Tu according to Equation (4) in the printing operation. Therefore, according to the second embodiment, a time period required for the printing operation can be shortened, compared with the first embodiment.

3. Modifications

The embodiments exemplified above may be modified in various manners. Specific modifications are exemplified below. Two or more aspects arbitrarily selected from the following exemplifications may be appropriately combined as long as the aspects do not contradict each other.

3-1. First Modification

In the first modification, the three-dimensional printing device 100 may not include the individual elevating mechanisms 235. That is, the heads 310 may not be able to move in the Z axis direction. However, when the three-dimensional printing device 100 do not include the individual elevating mechanisms 235, the distance D1 between each of the heads 310 and the surface WF in the Z axis direction may not be maintained in the predetermined range and the quality of printing may decrease. Therefore, it is preferable that the three-dimensional printing device 100 include the individual elevating mechanisms 235.

3-2. Second Modification

Although the moving mechanism 200 is driven to change relative positions of the heads 310 with respect to the workpiece W during the execution of the printing operation in each of the embodiments described above, the embodiments are not limited thereto. Specifically, when the workpiece support mechanism 900 can move along the X axis, the workpiece support mechanism 900 may be driven to move the workpiece W along the X axis, thereby changing the relative positions of the heads 310 with respect to the workpiece W.

3-3. Third Modification

Although each of the embodiments describes the case where the surface WF of the workpiece W includes the inclined region R1 and the flat region R2 in order to simplify the description, the embodiments are not limited thereto. For example, the surface WF of the workpiece W may include two inclined regions. One of the inclined regions is more inclined with respect to the X axis than the other inclined region. In addition, the surface WF of the workpiece W may include three or more regions inclined at different inclination angles. When the surface WF includes the three or more inclined regions, each of the heads 310 ejects ink in an ejection cycle Tu according to the inclination of a region facing the nozzle array L of the head 310 with respect to the X axis.

What is claimed is:

1. A three-dimensional printing device comprising:

a first head having a first nozzle array that ejects liquid;

a second head having a second nozzle array that ejects liquid;

a control circuit controlling ejection of ink from the first head and the second head, and a moving mechanism having a linear motion mechanism that changes relative positions of the first head and the second head with respect to a three-dimensional workpiece along a first axis, wherein when the workpiece includes a first region and a second region adjacent to the first region, the first region is more inclined with respect to the first axis than the second region as viewed along a second axis intersecting the first axis, and a time period when the first nozzle array faces the first region and the second nozzle array faces the second region during execution of movement by the linear motion mechanism is a first time period, the control circuit performs control such that the first nozzle array ejects the liquid onto the first region in a first ejection cycle in the first time period, and the second nozzle array ejects the liquid onto the second region in a second ejection cycle in the first time period, the first ejection cycle being shorter than the second ejection cycle.

2. The three-dimensional printing device according to claim 1, wherein when a time period when the first nozzle array faces the second region during the execution of the movement by the linear motion mechanism is a second time period, the first nozzle array ejects the liquid onto the second region in the second ejection cycle in the second time period.

3. The three-dimensional printing device according to claim 2, wherein the moving mechanism includes a linear motion encoder that outputs a pulse signal according to amounts of relative movement of the first head and the second head with respect to the workpiece along the first axis, the first ejection cycle and the second ejection cycle are defined based on the number of pulse signals output by the linear motion encoder, and the number of pulse signals for the first head to eject the liquid in the first ejection cycle is smaller than the number of pulse signals for the first head to eject the liquid in the second ejection cycle.

4. The three-dimensional printing device according to claim 1, wherein the first nozzle array is provided in a first nozzle surface of the first head, the second nozzle array is provided in a second nozzle surface of the second head, and the moving mechanism includes a first elevating mechanism that is moved by the linear motion mechanism to move the first nozzle surface along a third axis intersecting the first axis and the second axis, and a second elevating mechanism that is moved by the linear motion mechanism to move the second nozzle surface along the third axis.

5. The three-dimensional printing device according to claim 4, wherein in the first time period, an amount of the movement of the first nozzle surface by the first elevating mechanism is larger than an amount of the movement of the second nozzle surface by the second elevating mechanism.

6. The three-dimensional printing device according to claim 4, wherein the moving mechanism includes a linear motion encoder that outputs an output signal according to amounts of relative movement of the first head and the second head with respect to the workpiece along the first axis, a first elevation encoder that outputs an output signal according to an operational amount of the first elevating mechanism, and a second elevation encoder that outputs an output signal according to an operational amount of the second elevating mechanism, the first ejection cycle is defined based on the output signal of the linear motion encoder and the output signal of the first elevation encoder in the first time period, and the second ejection cycle is defined based on the output signal of the linear motion encoder and the output signal of the second elevation encoder in the first time period.

7. The three-dimensional printing device according to claim 4, wherein the moving mechanism includes a linear motion encoder that outputs an output signal according to amounts of relative movement of the first head and the second head with respect to the workpiece along the first axis, the first ejection cycle and the second ejection cycle are defined based on the number of pulse signals output by the linear motion encoder, and operations of the first elevating mechanism and the second elevating mechanism are defined based on the number of pulse signals output by the linear motion encoder.

8. The three-dimensional printing device according to claim 7, further comprising an energy emitting unit that emits energy to cure the liquid, wherein the moving mechanism includes a third elevating mechanism that is moved by the linear motion mechanism to move the energy emitting unit along the third axis, and an operation of the third elevating mechanism is defined based on the number of pulse signals output by the linear motion encoder.

9. The three-dimensional printing device according to claim 4, further comprising a controller that controls the first head, the second head, and the moving mechanism, wherein the moving mechanism includes a linear motion encoder that outputs a pulse signal according to amounts of relative movement of the first head and the second head with respect to the workpiece along the first axis, in the first time period, the moving mechanism determines the first ejection cycle and the second ejection cycle based on first correspondence information indicating a correspondence relationship between the number of pulse signals output by the linear motion encoder, the first ejection cycle, and the second ejection cycle, and the number of pulse signals output by the linear motion encoder, in the first time period, the moving mechanism determines a first movement amount of the first nozzle surface and a second movement amount of the second nozzle surface based on second correspondence information indicating a correspondence relationship between the number of pulse signals output by the linear motion encoder, the movement amount of the first nozzle surface, and the movement amount of the second nozzle surface, and the number of pulse signals output by the linear motion encoder, and in the first time period, the moving mechanism performs a process of controlling the first head to cause the first head to eject the liquid in the determined first ejection cycle, a process of controlling the second head to cause the second head to eject the liquid in the determined second ejection cycle, a process of controlling the first elevating mechanism to cause the first elevating mechanism to move the first nozzle surface by the determined first movement amount, and a process of controlling the second elevating mechanism to cause the second elevating mechanism to move the second nozzle surface by the determined second movement amount.

10. The three-dimensional printing device according to claim 9, wherein the controller generates the first correspondence information and the second correspondence information based on workpiece information indicating a position of the workpiece and a shape of the workpiece.

11. A three-dimensional printing device comprising:

a first head having a first nozzle surface in which a first nozzle array that ejects liquid is provided;

a second head having a second nozzle surface in which a second nozzle array that ejects liquid is provided;

a control circuit controlling ejection of ink from the first head and the second head, and a moving mechanism having a linear motion mechanism that changes relative positions of the first head and the second head with respect to a three-dimensional workpiece along a first axis, wherein the moving mechanism includes:

a first elevating mechanism to move the first nozzle surface along a third axis intersecting the first axis, and a second elevating mechanism to move the second nozzle surface along the third axis, the first elevating mechanism and the second elevating mechanism are moved along the first axis by the linear motion mechanism, and when a predetermined time period during execution of movement by the linear motion mechanism is a first time period, a cycle in which the first nozzle array ejects the liquid is a first ejection cycle in the first time period, and a cycle in which the second nozzle array ejects the liquid is a second ejection cycle in the first time period, an amount of movement of the first nozzle surface along the third axis in the first time period is larger than an amount of movement of the second nozzle surface along the third axis in the first time period, wherein the control circuit performs control such that the first ejection cycle is shorter than the second ejection cycle.

12. The three-dimensional printing device according to claim 11, wherein when a time period after the first time period during the execution of the movement by the linear motion mechanism is a second time period, the first nozzle array ejects the liquid in the second ejection cycle in the second time period.

13. The three-dimensional printing device according to claim 11, wherein when the workpiece includes a first region and a second region adjacent to the first region, and the first region is more inclined with respect to the first axis than the second region as viewed along a second axis intersecting the first axis and the third axis, the first nozzle array faces the first region in the first time period and the second nozzle array faces the second region in the first time period.

* * * * *